(12) United States Patent
Schumacher

(10) Patent No.: US 11,760,214 B2
(45) Date of Patent: Sep. 19, 2023

(54) DIGITAL ACCESS SYSTEM FOR VEHICLES FOR EXTERNALLY CONTROLLED LOADING PROCESSES

(71) Applicant: EGS ENTWICKLUNGS- UND FORSCHUNGS—GMBH, Stuttgart (DE)

(72) Inventor: Uli Erich Schumacher, Stuttgart (DE)

(73) Assignee: EGS Entwicklungs—und Forschungs—GmbH, Stuttgart (DE)

( * ) Notice: Subject to any disclaimer, the term of this patent is extended or adjusted under 35 U.S.C. 154(b) by 200 days.

(21) Appl. No.: 17/050,065

(22) PCT Filed: Apr. 25, 2019

(86) PCT No.: PCT/EP2019/060671
§ 371 (c)(1),
(2) Date: Oct. 23, 2020

(87) PCT Pub. No.: WO2019/207070
PCT Pub. Date: Oct. 31, 2019

(65) Prior Publication Data
US 2021/0074094 A1    Mar. 11, 2021

(30) Foreign Application Priority Data

Apr. 25, 2018  (DE) .......................... 102018109956.8
Apr. 25, 2018  (DE) .......................... 102018109962.2
Jun. 18, 2018  (DE) .......................... 102018114593.4

(51) Int. Cl.
*B60R 16/023*   (2006.01)
*B60L 53/14*    (2019.01)
(Continued)

(52) U.S. Cl.
CPC .......... *B60L 53/14* (2019.02); *G07C 9/00309* (2013.01); *H02J 13/00028* (2020.01);
(Continued)

(58) Field of Classification Search
CPC ..... H04W 12/08; H04W 12/47; H04W 12/06; H04W 12/55; H04W 12/33;
(Continued)

(56) References Cited

U.S. PATENT DOCUMENTS 8,265,816 B1    9/2012  LaFrance
2004/0130292 A1  7/2004  Buchanan et al.
(Continued)

FOREIGN PATENT DOCUMENTS

DE    102011018901 A1    10/2011
DE    102012105029 A1    12/2012
(Continued)

OTHER PUBLICATIONS

International Search Report; PCT/EP2019/060671; dated Jul. 18, 2019.
German Office Action; DE 10 2018 109 962.2; dated Oct. 25, 2018.

*Primary Examiner* — Dionne Pendleton
(74) *Attorney, Agent, or Firm* — Jones Day

(57) ABSTRACT

The invention relates to a digital access system (1), an electric vehicle (100) with such an access system and a method (200) for granting an access authorization to an electric vehicle with such an access system, comprising an unlocking unit (11) for positioning in the vehicle (100), at least one access unit (12) and at least one activation unit (13) for use outside the vehicle (100), wherein the activation unit (13) activates the unlocking unit (11) by means of wireless data communication (21) to the unlocking unit (11) at least for a period, the access unit (12) arranging access arranging access to the vehicle (100) from the outside by means of an independent wireless data communication (22) separate to the previous data communication (21) with the previously activated receiving unit (11), wherein the unlocking unit (11) transmits control signals (14) to the system controller (110) in response to the data communication (22) with the access (Continued)

unit (12) for controlling the locking system and activating at least one locking component (140) for allowing access to the vehicle to its loading.

24 Claims, 10 Drawing Sheets

(51) Int. Cl.
  *H02J 13/00* (2006.01)
  *H04W 12/47* (2021.01)
  *G07C 9/00* (2020.01)
  *H04L 9/32* (2006.01)
  *H04L 9/00* (2022.01)

(52) U.S. Cl.
  CPC ........... *H04L 9/3239* (2013.01); *H04W 12/47* (2021.01); *G07C 2009/00357* (2013.01); *G07C 2009/00388* (2013.01); *G07C 2009/00412* (2013.01); *G07C 2009/00523* (2013.01); *H02J 2310/48* (2020.01); *H04L 9/50* (2022.05); *H04L 2209/84* (2013.01)

(58) Field of Classification Search
  CPC ........... H02J 13/00028; H02J 2310/48; H01M 10/4257; G07C 2009/00357; G07C 2009/00388; G07C 2009/00412; G07C 2009/00523; G07C 9/00309; B60L 2240/70; B60L 2250/20; B60L 53/14; B60L 53/65; B60L 53/66; B60L 53/68; Y04S 30/12; Y04S 30/14; Y02T 10/70; Y02T 10/7072; Y02T 10/72; Y02T 90/12; Y02T 90/14; Y02T 90/16; Y02T 90/167; Y02E 60/10; H04L 2209/84; H04L 9/3239; H04L 9/50; E05F 15/73; E05F 15/77; E05F 15/40; E05F 15/76; E05F 15/622; E05F 15/70; E05F 15/614; E05F 2015/767; E05F 15/43; E05F 15/00; E05F 15/611; E05F 2015/433; E05F 15/431; E05F 2015/763; E05F 15/42; E05F 15/60; E05F 15/668; E05F 15/74; E05F 15/616; E05F 15/63; E05F 15/71; E05F 15/695; E05F 15/632; E05F 15/646; E05F 15/79; E05F 1/1091; E05F 15/41; E05F 2015/483; E05F 15/72; E05F 15/46; E05F 15/603; E05F 2015/434; E05F 15/75; E05F 5/12; E05F 15/689; E05F 2015/765; E05F 15/627; E05F 15/649; E05F 15/655; E05F 15/78; E05F 15/619; E05F 1/14; E05F 15/53; E05F 15/605; E05F 15/638; E05F 1/10; E05F 11/54; E05F 5/00; E05F 1/1041; E05F 15/44; E05F 15/659; E05F 17/004; E05F 3/02; E05F 3/04; E05F 3/16; E05F 15/643; E05F 1/105; E05F 15/657; E05F 15/665; E05F 15/686; E05F 17/00; E05F 2015/487; E05F 2017/005; E05F 2700/02; E05F 1/1215; E05F 11/34; E05F 13/02; E05F 15/56; E05F 15/624; E05F 15/681; E05F 2015/631; E05F 5/025; E05F 5/06; B60P 1/003
  See application file for complete search history.

(56) References Cited

U.S. PATENT DOCUMENTS

| | | | |
|---|---|---|---|
| 2008/0067974 A1 | 3/2008 | Zhang et al. | |
| 2008/0231417 A1* | 9/2008 | Kurpinski | G07C 9/00309 340/5.72 |
| 2009/0192655 A1 | 7/2009 | Ichikawa et al. | |
| 2012/0081071 A1 | 4/2012 | Asakura et al. | |
| 2012/0203409 A1 | 8/2012 | Sekijima et al. | |
| 2015/0298565 A1 | 10/2015 | Iwamura et al. | |
| 2016/0017630 A1 | 1/2016 | Fairbairn | |
| 2021/0107529 A1* | 4/2021 | Hirose | G06Q 30/04 |

FOREIGN PATENT DOCUMENTS

| | | | |
|---|---|---|---|
| DE | 112011105869 T5 | 8/2014 | |
| DE | 102014213248 A1 | 1/2016 | |
| DE | 112016006821 T5 | 2/2019 | |
| EP | 2426804 A1 | 3/2012 | |
| EP | 2712757 A2 | 4/2014 | |
| EP | 3056862 A1 | 8/2016 | |
| FR | 3043964 A1 * | 5/2017 | ........... B60R 25/245 |
| WO | 2011109460 A2 | 9/2011 | |
| WO | 2013039753 A1 | 3/2013 | |
| WO | 2015103164 A1 | 7/2015 | |
| WO | 2016159861 A1 | 10/2016 | |
| WO | 2017209735 A1 | 12/2017 | |
| WO | 2017209736 A1 | 12/2017 | |
| WO | 2018021573 A1 | 2/2018 | |

* cited by examiner

DIGITAL ACCESS SYSTEM FOR VEHICLES FOR EXTERNALLY CONTROLLED LOADING PROCESSES

CROSS-REFERENCE TO RELATED APPLICATIONS

This application is a national stage entry of PCT/EP2019/060671, filed on Apr. 25, 2019, which claims priority to German Provisional Application Nos. 102018109962.2, filed Apr. 25, 2018, 102018109956.8, filed Apr. 25, 2018, and 102018114593.4, filed Jun. 18, 2018. The contents of which are incorporated herein by reference in their entireties.

FIELD OF THE INVENTION

The invention relates to a digital access system, a vehicle with such an access system and a method for granting an access authorization to a vehicle with such an access system.

BACKGROUND OF THE INVENTION

To cover the power requirements of electric vehicles, charging stations are used to provide the electrical energy required for these vehicles. With the increasing number of electric vehicles and the desire for improved mobility, the problem arises that different users with different charging requirements visit such charging stations.

Document DE 10 2011 101 535 A1 discloses a system and method to simplify the refueling of electricity by means of a flexible allocation of certificates for the settlement of electricity costs. This involves an authentication device in the electric vehicle which authenticates the electric vehicle to a charging control device of the charging station, whereupon the charging station is released for the authenticated vehicle. Here a server transmits the required authentication data to the authentication device, wherein the server is also connected to the charging station via an energy supplier for checking the fueling certificate. To carry out this method and the corresponding system, however, the user has to be on site in order to grant the charging station the physical access to the electric vehicle required for refueling after authentication.

The majority of electric vehicles currently available will shut down their control system when not in use. As a result, all technical control module units in the electric vehicle are usually switched off after 10-20 minutes, which means that the vehicle battery can neither be charged nor discharged from the outside. In addition, in most models the access flap to the plug connection for connecting the vehicle accumulator to a charging station, in particular a power charging station, is blocked via the electric vehicle's locking system.

This prevents mobile charging of an electric vehicle or mobile loading of the electric vehicle with other goods without the presence of the user of the electric vehicle, as service staff without access authorization to the customer's electric vehicle cannot ensure that the system will release the necessary components of the electric vehicle during charging or loading. Activating the system could, for example, be achieved by handing over the vehicle key, which would require the vehicle owner's consent and the service staff to be on site at the time of disposal to hand over the vehicle key. In addition, once the electric vehicle has been charged or loaded, the vehicle key would have to be returned to the user, who would either have to pick up the key from the service company that carried out the refueling or have it brought to him by the service company. These measures are cumbersome and time-consuming for both the user and the service company.

At the same time, it would be desirable if the service life of a vehicle, in particular that of an electric vehicle during the required longer charging breaks, could be used for additional services, the performance of which would also require access to the respective vehicle. Such services would be, for example, the delivery and depositing of goods in the respective vehicle.

It would therefore be desirable to have a method or system available to carry out the charging or loading of a vehicle with greater flexibility, without the personal presence of the user, quickly and safely for the user.

SUMMARY OF THE INVENTION

It is therefore a task of the invention to provide a method or system with which the charging or loading of a vehicle with greater flexibility can be carried out quickly and safely for the user without the personal presence of the user.

This task is solved by a digital access system at least suitable for installation in a vehicle with a locking system and for suitable connection to a system controller of the vehicle, wherein the access system comprises at least one unlocking unit for positioning in the vehicle, at least one access unit and at least one activation unit for use outside the vehicle, wherein the activation unit is designed to activate the unlocking unit at least for a period by means of wireless data communication to the unlocking unit, the access unit is configured to arrange access to the vehicle from outside by means of an independent wireless data communication, that is separate from the previous data communication, with the receiving unit previously activated by the activation unit, wherein, in response to data communication with the access unit, the unlocking unit is configured to transmit access-initiating control signals to the system controller for controlling the locking system and unlocking at least one locking component to allow access to the vehicle to its load.

In this context, the term "vehicle" means any type of vehicle that can block access from outside to unauthorized persons by means of a locking system. The term "vehicle" here refers to vehicles with all types of engines, such as electric vehicles, vehicles with internal combustion engines or fuel cells (hydrogen-powered vehicles) or hybrid vehicles with at least two or more different types of engines as propulsion, comprising land or road vehicles as well as air and water vehicles.

The term "loading" refers to the addition of objects to the vehicle and comprises both the loading of the vehicle, e.g. with packages or goods, and the filling of the vehicle with operating, fuel or combustibles, which in the case of an electric vehicle also includes the electrical charging of the battery of the electric vehicle.

A system controller is the electrical/electronic system of the vehicle including all components (e.g. processor control chips, electronic circuits, etc.) required to operate and control the electrical/electronic system of the vehicle. The system controller is connected to the locking system, which comprises the vehicle components that can be electrically controlled by the locking, locking or blocking of vehicle components, such as locking systems for locks, doors, trunk lids, fuel filler flaps, etc., as well as circuits of all kinds designed to perform actions such as positioning a package in the trunk of the vehicle or refueling the vehicle via the usually locked fuel filler flap, so that the system controller can control and switch these components. The term "refueling" here comprises both the refueling of a vehicle with common fuels such as petrol or diesel as well as the filling of a vehicle tank with hydrogen and the recharging of a vehicle accumulator in the case of electric vehicles. The control signals transmitted to the system controller are imprinted according to the manufacturer-specific matrix, for example. Depending on the embodiment, the period of activation of the unlocking unit can be a predetermined period after the time of activation or is terminated after activation by performing an action such as closing a door, a filler flap or pulling a charging plug.

The unlocking unit is configured and designed for positioning in the vehicle. It can be permanently installed in the vehicle or integrated into a vehicle as a retrofit component by connecting it to the system controller in an appropriate way. In order to connect the unlocking unit to the system controller of the vehicle, appropriate connections can be provided in the vehicle's wiring harness, e.g. already at the factory when the vehicle is first installed. The unlocking unit can be integrated into the vehicle's wiring harness (bus system) via these connections during initial installation or at a later date. The bus system of the vehicle can be activated by a corresponding impulse, so that the specific charging control system is activated by the system controller. The data protocols exchanged between the unlocking unit and the system controller must be adapted to the manufacturer-specific structure of the vehicle in question. Alternatively, an opening mechanism on the tailboard or other locking component of the vehicle may be replaced when the vehicle is retrofitted with the access system according to the invention as a spare part, if access to the system controller or the wiring harness in the vehicle is not possible and the access system should still allow access to the vehicle. The unlocking unit can be mounted at any suitable position in the vehicle, which on the one hand allows undisturbed wireless Data communication with the external components activation unit and access unit (e.g. at places without impairing shielding of radio signals, WLAN signals etc.) and on the other hand a reliable electrical connection with the system controller has to be established. The access and activation units must also be configured for wireless data communication with the unlocking unit. Data communication with the unlocking unit is used by the access unit to start up the system controller and thus the usage systems in the vehicle. After the charging and/or loading process has been completed, these can also be shut down again after a corresponding data communication. Service employees, mobile loading vehicles, authorized parcel service providers or employees with access authorization to the access system are thus given the opportunity, after activating the necessary vehicle and user data, to gain access to the respective vehicle for which such access is to be granted by the user via the invention-based access system.

In one embodiment, the unlocking unit is designed at least for receiving signals and/or data by means of radio, WLAN or near field communication, preferably RFID. These techniques for wireless data communication are technologies with which data can be reliably exchanged between two transmitter or receiver stations over different distances, wherein the transmitter and receiver can be provided in a very space-saving manner and can be provided with their own power sources. The activation unit can be configured to deactivate the previously activated activation unit with a corresponding signal. Thus the deactivation can be effected on the one hand by a temporal expiration of an activation period as well as by an actively sent out signal. The access unit can also be configured to transmit a signal to the unlocking unit after a successful access to a vehicle, which causes the unlocking unit to relock all previously unlocked components in cooperation with the system controller and the locking system.

Data communication is designed in such a way that the activation unit sends at least command data for activating the unlocking unit, which can contain a time definition of the activation duration in addition to the activation command. This activation duration can be a predetermined duration or, depending upon desire in individual cases, can be specified by appropriate inputs in or for the activation unit. However, the activation can also be reset as soon as the end of the charging and/or loading process is reached. The deactivation of the activation therefore does not have to be controlled by time duration, but can also take place with the end of the charging and/or loading process by a corresponding action, for example by disconnecting the charging cable from the charging plug. The activation unit can be, for example, a wireless or Internet-capable mobile terminal, smartphone, tablet PC, computer, or other digital communication device such as a transponder.

With the access system according to the invention, charging or loading of a vehicle can be carried out quickly and safely for the user with greater flexibility without the user having to be present in person.

In this context, the access system according to the invention can be implemented or retrofitted by installing the software programs to be executed (for example in the activation and/or access unit and/or activation unit) on other possibly already existing systems.

In one embodiment the unlocking unit comprises a processor unit with memory on which data for authorizing the activation unit and/or the access unit are stored, and the processor unit is configured to perform an authorization check on the basis of these data. Such an authorization check protects the access system according to the invention against abusive access by third parties. For example, the authorization check can be performed by comparing authorized access codes stored in the memory with an access code transmitted by an activation unit. If the transmitting access code is not in memory, the access system may block the activation of the receiving unit. To store authorized access codes (or other data proving authorization), the receiving unit may comprise a data interface that could be configured differently depending on the embodiment, for example, as a USB interface or as a radio or Internet interface for input via an authorized web page of the access system operator.

In another embodiment the unlocking unit is configured to perform the activation only after a successful authorization check of the activation unit. This prevents unauthorized access units from gaining access to the access system in the first place.

In another embodiment the unlocking unit is configured to send out signals to scan for available access units in the activated state. Thus, access can be simplified, since the access unit does not have to search for the unlocking unit itself. For example, after a successful search of the unlocking unit for an authorized access unit, the unlocking unit can send out a signal (e.g. a switched on blinker) via the system controller of the vehicle, for example, to make it easier for a service employee holding the access unit to find the relevant vehicle. This could be particularly advantageous in parking garages.

In another further embodiment the access unit is configured to transmit at least one identification code to the unlocking unit, on the basis of which the unlocking unit can carry out an authorization check of the access unit, wherein the transmitting of the control signals to the system controller only takes place after a successful authorization check of the access unit. This prevents unauthorized access units from gaining access to the access system with an activated unlocking unit. The same applies to the design of the access unit and the execution of the authorization check as described above for the authorization check of the activation unit.

In another embodiment the access unit is a transponder which is configured to transmit at least the identification code to the unlocking unit after receiving the data communication from the unlocking unit. Transponders are small and compact units with which identifying and other content data can be easily transmitted. Transponders can also be worn comfortably on clothing or in a service staff vehicle to carry out the loading of the vehicle.

In another embodiment the transponder is a passive transponder. Passive transponders only transmit data in response to a received signal by using the energy of the received signal to transmit a signal of their own. Passive transponders limit the range of data communication with the unlocking unit, which increases the security standard of the access system, since large area scanning of activated unlocking units for misuse is hindered. On the other hand, these transponders only respond to active unlocking units, so that vehicles with non-activated unlocking units cannot be identified or located as such, which also increases the security of the system.

In another embodiment the unlocking unit is configured to instruct the system controller, at the latest after expiry of the predetermined period of activation, to relock the components unlocked on the basis of the previous data communication with the access unit. Locking after the activation time has expired further increases access security. Furthermore, the automatic locking prevents the service employee from inadvertently forgetting to lock the device if the access unit does not send a corresponding signal.

In another embodiment the access unit is configured to arrange for locking of the respective components by means of corresponding data communication with the unlocking unit by the system controller of the vehicle after completion of the loading of the vehicle. The completion of a performed loading can be determined, for example, by closing the previously unlocked components. The locking is thus automatic without any further steps to be carried out by the service employee carrying or operating the access unit, and facilitates the handling of the access system. At the same time, the security of the access system is increased, as inadvertent locking is prevented.

In another embodiment the unlocking unit is configured to transmit characteristic data about the completed loading of the vehicle to the activation unit and/or the access unit after the components of the vehicle have been locked. This data transfer allows the charging and/or loading process to be logged and can be used for subsequent billing of the charging service. The data transmission to the activation unit, usually under the control of the owner or user of the vehicle, also constitutes a receipt of the charging and/or loading process for the owner or user.

In another embodiment the unlocking unit is configured for reversible arrangement in the vehicle and for connection to the system controller. This allows vehicles according to the invention to be retrofitted with the digital access system. The skilled person is able to design the necessary connections and interfaces for the unlocking unit in an appropriate way.

In another embodiment the access system comprises a background computer system, which is configured to enable at least one registration of users and an entry of data of the vehicles and/or of the unlocking units and/or of the access units and/or of the activation units as well as their assignment to the vehicles and/or users and to perform a suitable transmission of data (for example duration, user data, loading data) to the unlocking unit to enable an authorization check to be carried out by the unlocking unit.

For example, a vehicle parked by the user can be found via a client account in the background computer system and the location data entered in it by the service staff responsible for the load. In one embodiment, the activation unit is a smartphone with an application installed on it that uses a positioning system (e.g. a GPS system) to store the vehicle's location in the background computer system, for example when the user leaves the vehicle. Via the background computer system, the user can order loadings of the vehicle, for example an overnight loading of his electric vehicle, for example in a public parking lot, to which a corresponding charging vehicle is directed via the vehicle location stored in the background computer system. The service vehicle can be equipped with the appropriate cable connections (plugs) for different electric vehicles and can have mobile AC or DC charging stations, if necessary with variably adjustable charging voltages. The respective order for a charge and, if necessary, activating the authorization data for the unlocking unit as well as other communicated data can, for example, be carried out via a Distributed Ledger Technology (DLT) program system, in particular block chain program system within the background computer system. For this purpose, the background computer system can comprise one or more interconnected servers which, for example, can also be able to communicate with the activation units and access units via appropriate interfaces. Such a background computer system facilitates the operation of the digital access system and the billing of services and, if appropriately designed with access controls and the allocation of access rights, increases the security of the access system. When the unlocking unit transmits further drive-related data, the background computer system can also bill for other services, such as mileage-based vehicle taxes or parking and toll fees. In a further embodiment, the data communications are therefore encrypted.

In another embodiment the vehicle is an electric vehicle and the control signals transmitted from the unlocking unit to the system controller are provided to enable at least one charging and/or loading of the electric vehicle or one opening of a trunk and/or a loading area by means of releasing the corresponding components of the electric vehicle. The term electric vehicles refers to vehicles that are equipped with at least one electric drive. This also includes hybrid vehicles which, in addition to an electric drive, comprise a further drive system such as a fuel cell or an internal combustion engine or are only equipped with an electric drive system as a supplement. This means that the electric vehicle can be charged or loaded with goods from the outside by means of a control system when the vehicle is at rest, irrespective of the presence of a user or owner of the electric vehicle.

The invention further relates to a vehicle with a locking system and a control unit at least for controlling the locking system as well as a digital access system according to the invention comprising at least one access unit and at least one activation unit for use outside the vehicle and an unlocking unit positioned in the vehicle and suitably connected to the control unit in order to allow access to the vehicle to its loading by controlling the locking system and releasing at least one locking component.

With the vehicle according to the invention, a load of a vehicle with greater flexibility can be carried out quickly and safely for the user without the user having to be present in person.

In one embodiment, the unlocking unit is connected to a receiving aerial of the vehicle. This increases the reliability of Data communication with the activation unit and/or the access unit.

In another embodiment the unlocking unit is arranged in the vehicle at a location inaccessible from the outside and/or from the interior of the vehicle. This increases the theft protection for the unlocking unit and prevents unauthorized persons from knowing that such an unlocking unit is installed in the vehicle.

In another embodiment the unlocking unit is reversibly installed in the vehicle. This means that the access system according to the invention can be retrofitted in vehicles and easily removed from them again if necessary.

In another embodiment vehicle is an electric vehicle and the control signals transmitted from the unlocking unit to the system controller are provided to enable at least one charging and/or loading of the electric vehicle or one opening of a trunk and/or a loading area by releasing corresponding components of the electric vehicle. This means that the access system can also be applied to electric vehicles. This ensures that a control system can be used to load an electric vehicle from the outside in the idle state, regardless of the presence of a user or owner of the electric vehicle.

In another embodiment it is provided that the system controller of the vehicle unlocks at least one filler flap as one of the components on the basis of the control signal of the unlocking unit when charging of the electric vehicle is desired and/or functionally unlocks it via diagnostic connections of the electric vehicle. This ensures that the electric vehicle can still be charged from the outside with a control system in the idle state regardless of the presence of a user or owner of the electric vehicle.

The invention further relates to a method for granting an access authorization to a vehicle (100) with a locking system and a control unit at least for controlling the locking system as well as a digital access system installed in the vehicle according to the invention comprising at least one access unit and at least one activation unit for use outside the vehicle and an unlocking unit positioned in the vehicle and suitably connected to the control unit, comprising the following steps:

activating the unlocking unit at least for a period by the activation unit located outside the vehicle by means of wireless data communication to the unlocking unit;

arranging an access from outside to the vehicle by the access unit also located outside the vehicle by means of an independent wireless data communication separate to the previous data communication with the receiving unit previously activated by the activation unit;

transmitting of control signals that arrange access to the system controller by the unlocking unit in response to the data communication with the access unit; and controlling the locking system and enabling at least one locking component to allow access to the vehicle for loading the same by the system controller.

With the method according to the invention, a loading of a vehicle according to the invention can be carried out quickly and safely for the user with greater flexibility without the personal presence of the user.

In one embodiment of the method, wherein the unlocking unit comprises a processor unit with memory on which data for authorizing the activation unit and/or the access unit are stored, the method comprises the further steps:

carrying out an authorization check of the activation unit using these data by the processor unit and activating the unlocking unit only after the authorization check of the activation unit has been successful, and/or Carrying out an authorization check of the access unit by means of an identification code transmitted from the access unit to the unlocking unit by the processor unit and transmitting the control signals only after success of the authorization check of the access unit.

In a another embodiment of the method, the method comprises the further steps:

instructing the system controller by the unlocking unit, at the latest after the expiry of the predetermined period of activation, to lock the components for loading the vehicle if they have been unlocked due to the previous data communication with the access unit; and/or locking of the corresponding components by the system controller of the vehicle after completion of the loading of the vehicle after corresponding data communication between access unit and unlocking unit.

In another embodiment of the method, the method comprises the further step:

transmission of characteristic data about the completed loading of the vehicle by the unlocking unit to the activation unit and/or to the access unit after the components of the vehicle have been locked.

In another embodiment of the method, wherein the vehicle is an electric vehicle, enables transmitting access arranging control signals to the system controller at least one charging and/or loading of the electric vehicle or an opening of a trunk and/or a loading area by means of releasing the corresponding components of the electric vehicle.

The embodiments listed above can be used individually or in any combination to form the device and method according to the invention.

In particular, the digital access system described above, a vehicle with such a locking system as well as the method for granting an access authorization to a vehicle with a locking system enables charging systems to be used in which dynamic charging of the vehicle designed as an electric vehicle can be realized by means of mobile charging vehicles.

In the following, such a charging system for dynamic charging of electric vehicles, in particular an accumulator of a vehicle described above with a digital access system described above with a corresponding software application which can be part of the computer background system, in particular comprising it at least partially, and a corresponding method as well as a data storage product with software application stored thereon are described.

As described above, charging stations are used to cover the power requirements of electric vehicles and provide the necessary electrical energy. With the increasing number of electric vehicles and the desire for improved mobility, especially for long-distance journeys, the problem arises that different users with different charging requirements have to visit charging stations that may be far off their planned driving route and whose charging capacity or availability of charging points is exhausted due to a time-related large rush of customers and therefore further detours have to be accepted without exhausting the battery of the electric vehicle.

Document US 2015/0298565 A1 discloses a charge support system and method for supporting the loading of an electric vehicle, which is intended to prevent electric vehicles from draining the battery and stopping before reaching their destination. To this end, a control center monitors the state of charge of a large number of electric vehicles and, if the state of charge is low, transmits to them a request to drive to a stationary electric charging station located at a certain point and guides the electric vehicles to a suitable electric charging station, wherein the conditions of the electric charging station (amount of energy available there, expected customer rush, etc.) are taken into account when selecting the electric charging station.

This can prevent electric vehicles from breaking down due to a discharged battery during an overland trip.

A dynamic charging system for recharging a battery makes it possible to take better account of the individual needs of the driver of the electric vehicle along its route and to charge the vehicles more effectively.

More precisely a charging system for dynamic charging of electric vehicles comprises at least one navigation function on at least one mobile device or connectable to a navigation device, and/or software application installed and executed on at least one server, and a plurality of mobile charging vehicles each having a navigation apparatus configured to, inter alia, transmit a current position of each mobile charging vehicle of the charging system to the software application, wherein the software application is configured to display at least the respective next mobile charging vehicle on the mobile device located in an electric vehicle and, in the case that an electric battery of the electric vehicle is to be charged, to transmit a charging request for this electric vehicle and at least one current position of the electric vehicle to the displayed mobile charging vehicle, wherein the navigation apparatus of the charging vehicle is configured for transmitting coordinates of a suitable common meeting point and a suitable meeting time for charging the battery of the electric vehicle to the mobile device in the electric vehicle to be charged on the basis of the received charging request, wherein the software application is configured to convert the meeting point and meeting time into navigation instructions for a driver of the electric vehicle to be charged.

Due to the position of both vehicles (mobile charging vehicle and electric vehicle to be charged) and the defined common meeting point, dynamic charging is made possible in which both vehicles move from their respective starting positions towards the meeting point and thus dynamically approach an effective meeting point. This saves time and resources for the electric vehicle to be charged or its driver in comparison to a stationary charging station (charging station). At least the next charging vehicle can be displayed on a map displayed on a screen, for example of the mobile device, by means of a corresponding symbol or marker, or by indicating coordinates or addresses to be approached accordingly. The transmission of the common meeting point can be the implicit order confirmation for charging the electric vehicle according to the transmitted charging request. However, an explicit order confirmation can also be sent from the charging vehicle to the software application on the mobile device.

The term "electric vehicle" refers to all vehicles with an electric motor including hybrid vehicles with additional other types of motors. The term "charging vehicle" refers to vehicles that comprise an energy reservoir for conversion into electrical energy and can thus provide this electrical energy for charging a vehicle battery for operation of an electric vehicle at any location. For example, such charging vehicles can be trucks with appropriate equipment. These charging vehicles can themselves be powered by an electric motor, but can also comprise other types of engines such as internal combustion engines, hybrid engines or other engines for personal transport. The navigation apparatus of the mobile charging vehicle determines both the current position of the charging vehicle and calculates the common meeting point. The navigation apparatus can, for example, be a navigation system that has been extended in its functionality. The meeting time can be influenced by possibly still running power refueling of other electric vehicles at a preceding agreed meeting point with another electric vehicle, because in such cases the charging vehicle cannot start immediately to the new common meeting point. Provided that the transmitting of the charging request is done in time, this does not hinder the common meeting point, but at best it influences the position of the common meeting point, so that it may move further along the planned driving route of the electric vehicle to be charged towards the electric vehicle's destination.

In this context, the term "software application" refers to application software (also called application program, or application or application (APP) for short), which describes computer programs that are used to process or support a useful or desired non-system functionality. Mobile APPs (on mobile devices) can, for example, be obtained via an APP Store integrated into the mobile operating system and installed directly on the device. Mobile Web APPs can be accessed via the web browser of the mobile device. Installation refers to the installation of the software application on the mobile device itself or an interface for using a corresponding application program via a web page. Execution of the software application is defined as the execution via a processor of the mobile device or the processing of data provided to the mobile device via the interface via a Web-APP.

In this context, the term "mobile device" means a device that is configured to establish a radio or Internet connection with other devices and has a display screen. Such mobile devices are for example smartphones, tablet PCs, laptops, digital communication devices or navigation devices on which software applications can be installed and executed. In particular, it may be an IOS or Android smartphone, a device installed in the vehicle, such as an Android Device and/or a media system of the vehicle. The navigation function of the mobile device enables the navigation instructions generated by the software application to reach the appropriate common meeting point to be converted into a navigation route to the meeting point, which the driver can use to drive to the common meeting point with the charging vehicle. Alternatively, the mobile device can be connected to a navigation device, wherein the navigation instructions of the software application are processed into a corresponding navigation route by the navigation device in electric vehicle using appropriate interfaces. If the mobile device is on board an electric vehicle, the position of the mobile device is identical to the position of the electric vehicle. This means that either the current position of the mobile device or the current position of the electric vehicle from a navigation device in electric vehicle can be transmitted to the charging vehicle via the mobile device as position information of the electric vehicle.

Thus, the dynamic charging system enables an effective charging of the electric vehicle and takes into account the individual needs of the customer of the electric vehicle. In contrast to the state of the art, the charging and/or loading process is not viewed exclusively from the perspective of the locally fixed charging station, but combines the conditions of the mobile charging station with the position and movement data of the electric vehicle and, if necessary, its movement data to create a more effective charging and/or loading process for the electric vehicle compared to the state of the art.

In one embodiment the software application only generates the navigation instructions from the common meeting point and meeting time for the electric vehicle, after a confirmation of the charging request at the common meeting point was transmitted to the charging vehicle via the software application. This allows the driver of the electric vehicle to first check whether the common meeting point and meeting time are acceptable for him and the charge level of his electric vehicle. If not, the electric vehicle can, if necessary, continue its route and, after displaying another mobile charging vehicle at a later time, take advantage of the charging by the charging vehicle offered. This gives the charging system a flexibility for the driver of the electric vehicle that can take even greater account of his customer's wishes.

Further an exchange of data between the server and the mobile device and/or a data storage and/or an exchange of data within the software application at least partially using distributed ledger technology (DLT), in particular a block chain system, is carried out. This increases security due to better protection against data loss and/or additional encryption of the data.

In another embodiment the common meeting point and the meeting time are determined by the navigation apparatus of the mobile charging vehicle taking into account at least one previous route of the electric vehicle to be charged, wherein the software application transmits the previous route to the mobile charging vehicle with the charging request on the basis of correspondingly recorded position data. By taking the previous route into account, the driving behavior of the electric vehicle, such as current speed, previous average speed and future direction of movement can be used as a basis for the calculation of an appropriate common meeting point, whereby the route of the electric vehicle for the desired charging is disturbed even less than if only the current position of the electric vehicle at the time of transmission of the charging request is used as a basis. The previous route can be taken by the software application from a navigation device connected to the mobile device or it can be recorded by the software application based on an existing navigation function in the mobile device itself, for example based on the time sequence of the GPS data determined by the mobile device itself using a GPS module.

In another embodiment the software application transmits to the charging vehicle, in addition to the previous route, also the route planned for the electric vehicle up to a route destination, and the navigation apparatus of the charging vehicle takes into account the planned route to calculate the common meeting point and the meeting time. Taking into account the further planned route, the common meeting point and the corresponding meeting time can be adjusted even better to the needs of the driver of the electric vehicle, so that the route of the electric vehicle for the desired charging is even less disturbed. The planned route in electric vehicle can also be taken by the software application from a navigation device in electric vehicle connected to the mobile device, or provided by the software application on the basis of an existing navigation function in the mobile device itself.

In another embodiment the navigation apparatus of the charging vehicle automatically calculates the fastest route for the charging vehicle to the meeting point and displays it in the charging vehicle as a driving route. In this way the charging vehicle reaches the common meeting point the fastest, which extends the spatial range of possible appropriate common meeting points, taking into account the customer's wishes and the least possible disturbance of the electric vehicle's route.

In another embodiment the navigation apparatus of the charging vehicle transmits the current position of the charging vehicle at least periodically to the software application for a retrieval in the electric vehicle on a path to the common meeting point. Thus it can be constantly checked up to the meeting time whether the common meeting point can be reached by the charging vehicle as planned at the meeting time. If necessary, the electric vehicle could cancel the common meeting point in case of an unplanned delay and arrange another meeting point, if necessary with another mobile charging vehicle.

In another embodiment the software application is configured to display the current position of the charging vehicle on the way to the common meeting point on a navigation display in the electric vehicle. Via such a display, the driver of the electric vehicle is provided with a simple visual and thus immediate control whether the agreements on meeting point and meeting time can be adhered to.

In another embodiment the software application is configured to display all positions of all charging vehicles in order to enable a selection of a desired charging vehicle for charging the electric vehicle. Also, in an embodiment, the driver of the charging vehicle can also suggest a common meeting point alternatively or together with the previous embodiments and is therefore not dependent on the meeting point calculated and transmitted by the charging vehicle. This enables the driver of the electric vehicle to plan his refueling stops highly efficiently in advance of his journey along a driving route. For example, he can also arrange a meeting point at a rest stop with the charging vehicle at lunchtime or have the electric vehicle recharged on the premises of his business partner during an appointment (e.g. a customer visit), for which the software application provides the necessary options.

In another embodiment the charging vehicle has an energy storage or battery storage of more than 300 kWh and at least one DC charging unit and at least one AC charging unit. All established electric vehicles can be charged with it. The charging vehicle can also comprise more DC or AC charging stations, for example two DC charging units and two AC charging units. This means that a common meeting point can be arranged for the more than one electric vehicle, as long as the routes of the respective electric vehicles make this appear reasonable and as little disruption to the routes of the respective electric vehicles.

The charging of the electric vehicle can be invoiced on the basis of the travel time to the meeting point and the charging time on a time basis or on the basis of the travel time to the meeting point and the amount of charged energy.

Furthermore, a method for dynamic charging of electric charging vehicles in a before described charging system comprising a software application installed and executed at least on at least one mobile device which comprises a navigation function or respectively connectable to a navigation apparatus, and a plurality of mobile charging vehicles each having a navigation apparatus), comprising the following steps can be realized:

transmitting current positions of each mobile charging vehicle of the charging system to the software application by the navigation apparatus of the charging vehicle;

displaying at least the respective next mobile charging vehicle on the mobile device located in an electric vehicle by the software application;

transmitting by the software application a charging request for the electric vehicle and at least one current position of the electric vehicle to the displayed mobile charging vehicle in the case of an electric vehicle having an electric battery to be charged;

transmitting coordinates of a suitable common meeting point and a suitable meeting time for charging the battery of the electric vehicle based on the received charging request to the mobile device in the electric vehicle to be charged by the navigation apparatus of the charging vehicle; and Conversion by the software application of meeting point and meeting time into navigation instructions for a driver of the electric vehicle to be charged by the software application for navigation of the electric vehicle to the common meeting point.

This method thus enables an effective charging of the electric vehicle, taking into account the individual needs of the customer of the electric vehicle and, in contrast to the state of the art, does not consider the charging and/or loading process exclusively from the point of view of the locally fixed electric charging station, but combines the conditions of the mobile charging station with the position and charging situation of the electric vehicle and, if necessary, its movement data to create a much more effective charging and/or loading process for the electric vehicle compared to the state of the art.

In a further embodiment of the method, the method comprises the additional step of determining the common meeting point and the meeting time taking into account at least one previous route of the electric vehicle to be charged from the navigation apparatus of the mobile charging vehicle, wherein the software application has transmitted the previous route to the mobile charging vehicle together with the charging request on the basis of correspondingly recorded position data.

In a further embodiment of the method the software application transmits, in addition to the previous route, also the route planned for the electric vehicle up to a route destination to the charging vehicle and the navigation apparatus of the charging vehicle takes into account the planned route for calculating the common meeting point and the meeting time.

In a further embodiment of the method, the method comprises the additional step of at least periodically transmitting the current position of the charging vehicle on a path to the common meeting point by the navigation apparatus to the software application for a retrieval in the electric vehicle.

In a further embodiment of the method, the method comprises the additional step displaying the current position of the charging vehicle on its way to the common meeting point by the software application on a navigation display in the electric vehicle.

In a further embodiment of the method, the software application displays all positions of all charging vehicles to enable selection of a desired charging vehicle for charging the electric vehicle, followed by selecting one of the displayed charging vehicles as the charging vehicle for charging the battery of the electric vehicle.

In a further embodiment of the method, the software application suggests a meeting point and/or a common meeting time to the charging vehicle, which is adopted by the charging vehicle as common meeting point and common meeting time. The suggested meeting point and/or meeting time can be entered into the mobile device by an operator of the mobile device, for example the driver of the electric vehicle, for which purpose the software application provides a corresponding input mask. The desired meeting point can be entered, for example, by entering the location coordinates or by marking a corresponding point on an input mask designed as a map.

Furthermore, a data storage product can be realized with a software application stored on the data storage product appropriate for the execution of the software application related steps of the method for dynamic charging.

Data storage products can be any memory suitable for storing software programs such as software applications, such as data sticks, CDs, hard drives, servers and other devices suitable for this purpose.

The embodiments of dynamic charging listed above can be used individually or in any combination to design the dynamic charging device and method.

It is obvious that the digital access system can support dynamic charging by allowing the charging vehicle, especially an occupant, such as a driver, service person or other employee, access to the electric vehicle for charging the energy storage or accumulator. For example, a tailboard can be released for charging the electric vehicle. For this purpose, data for activating the unlocking unit are transmitted to the charging vehicle or the occupant by the activation unit for at least a period of time.

The activation of the unlocking unit can be carried out in particular as follows.

Essential components are the software application that interacts with the vehicle to be charged. In particular, the software application is a server-supported application which evaluates incoming information from the vehicles to be loaded and/or the charging vehicles, controlling the charging vehicles, determining meeting points and/or regulating the billing.

The interaction with the vehicle to be loaded can be achieved by partially installing the software application on a mobile device and/or by installing and executing a mobile application connected to the software application on a mobile device, wherein access to necessary vehicle data is provided in particular via an OBD2 interface of the vehicle.

Preferably, the communication between the parts of the software application installed on the server and the mobile device, in particular the forwarding and storage of the data required in particular for controlling the access to the vehicle to be loaded, the loading of the vehicle to be loaded and the settlement of the loading, is carried out using DLT, in particular via a block chain application. This creates a multiple redundant security for all regulation, contract and billing processes, which is, however, transparent for all partners in the defined area.

For example, the mobile device or mobile application receives all essential information from the vehicle to be charged via the OBD2 interface, such as driving style, charging capacity and state of charge of the battery, temperature and position.

Furthermore, the part of the software application or the mobile application executed on the mobile device knows the destination, if necessary the parking place of the vehicle to be charged, has access to navigation data and traffic situation and is connected to the internet.

The software application calculates when the vehicle to be loaded has to meet a charging vehicle where and how much electrical energy is required.

The DLT, in particular block chain technology, is used to transmit the corresponding data to the server or to store this data. The server, by means of which the vehicles to be loaded and the charging vehicles are monitored, confirms via the DLT or block chain to the part of the software application or the mobile application executed on the mobile device the meeting of the vehicle to be loaded and the planned meeting point. However, these are not static, but can be adapted based on changes recorded by the software application and/or the mobile application.

The software application also receives data that allows the access system to allow the charging vehicle to access the vehicle to be loaded for the loading. This can be done independently of the use of DLT or block chain technology. Preferably, the data has a limited validity period, which is adapted to the planned time of the meeting between charging vehicle and vehicle to be loaded. Preferably, the data only allow access a certain time before or after a calculated time of the meeting. The data may comprise, for example, a code that can only be used once. After the one-time use or the expiration of the validity period, the code can no longer be used to access the vehicle to be loaded. The data required for access is generated or transmitted in particular as follows.

Personal data of the persons involved, such as movement profiles, remain as highly sensitive data within the part of the software application or mobile application executed on the mobile device in the vehicle to be loaded. The mobile device reports only an ID of the customer and time and place of the planned meeting point to the server. The transmission of the data is encrypted, especially via the DLT or block chain.

For each loading process a new DLT or block chain process is generated. Also new orders of the same customer or repeat orders lead to a new DLT or block chain process. This prevents individual order data, access codes or other data related to the loading process from being reused after the loading process has been completed and the block chain closed.

Due to the encryption by the DLT or block chain, it is not possible to retrieve this data in such a way that it can be misused, as the data is useless for other loading or payment processes. Each load order is unique and cannot be changed due to the DLT or Blockchain technology.

With a single block chain process an individual order number is linked, with which only a single loading process or loading order can be triggered.

In particular, the server can be designed as a high-performance clustered server or be designed as a cloud application. The server controls all charging vehicles and negotiates with the vehicle to be loaded possible meeting points within the transmitting parameters. For this purpose, the software application uses a block chain to determine all data necessary for processing the loading process, compares it with the real conditions and possibilities and offers the user of the vehicle to be loaded an order confirmation. If the order confirmation is accepted, the data necessary for the loading process, in particular code for the access system, meeting point, meeting time are transmitted to the vehicle to be loaded, the charging vehicle, in particular the operator of the vehicle to be loaded or the operator of the charging vehicle.

Furthermore, the software application arranges and monitors the loading process, wherein this process, in particular due to the use of the block chain technology, after the acceptance of the order confirmation, has an automatic sequence in which it is basically not possible to intervene. If a charging vehicle breaks down, a new block chain process is generated and then carried out with an alternative charging vehicle.

The use of the DLT or block chain offers the advantage that it can be built on existing block chain applications and thus, in addition to the logistical handling of the loading process, payment and accounting processes or their formalities can be handled.

The server or software application can manage all contracts with the operators of the vehicles or charging vehicles to be loaded, as well as settle and controlling all transactions.

Furthermore, the server offers an interface to partners such as electricity providers, other charging vehicle providers or the fleet management of companies and organizations via the DLT or block chain.

The DLT or block chain can be implemented as an ERC20/ERC223 solution and can run on an existing block chain application.

The advantage of the DLT or block chain technology used in the charging system is that it performs the task of a decentralized, multiple redundant database and offers the possibility to carry out and automate the contract management via smart contracts (electronic automatic contracts) with high security.

It is thus possible to provide an encrypted connection for the exchange of the necessary data between all parties, wherein Smart Contracts are the preferred means of regulating who has access to which data and who can view which information and how.

The billing can preferably be done via own tokens, which are preferably also connected via Smart Contracts with classical payment providers, such as credit card providers, parties involved in SEPA payment transactions and/or providers such as PayPal.

The use of DLT or block chain technology enables cost optimization due to the reduced hardware and software structure required for loading, as well as the high degree of automation and the resulting reduction of manual intervention, without reducing security. Furthermore, the use of this technology improves safe and clearly regulated communication possibilities between an unlimited number of partners. The server or cloud resources as well as the software application or the mobile application do not have to open vulnerable interfaces.

The previously described charging system for dynamic charging can be realized according to the following examples, wherein this realization can be realized additionally or independently from the claimed digital access system.

B1. A charging system (1001) for dynamic charging of electric vehicles (1002), in particular a vehicle with a digital access system in accordance with the claims, comprising at least one navigation function on at least one mobile device (1003) or connectable to a navigation device (1022), and/or software application (1004) installed and executed on at least one server, and a plurality of mobile charging vehicles (1005) each having a navigation apparatus (1051) configured to, inter alia, transmit a current position (P5) of each mobile charging vehicle (1005) of the charging system (1001) to the software application (1004), wherein the software application (1004) is configured to display at least the respective next mobile charging vehicle (1005) on the mobile device (1003) located in an electric vehicle (1002) and, in the case that an electric battery (1021) of the electric vehicle (1002) is to be charged, to transmit a charging request for this electric vehicle (1002) and at least one current position (P2) of the electric vehicle (1002) to the displayed mobile charging vehicle (1005), wherein the navigation apparatus (1051) of the charging vehicle (1005) is configured for transmitting coordinates of a suitable common meeting point (TP) and a suitable meeting time (TZ) for charging the battery (1021) of the electric vehicle (1002) to the mobile device (1003) in the electric vehicle (1002) to be charged on the basis of the received charging request, wherein the software application (1004) is configured to convert the meeting point (TP) and meeting time (TZ) into navigation instructions for a driver of the electric vehicle (1002) to be charged.

B2. The charging system (1001) according to example B1, characterized in that the software application (1004) only generates the navigation instructions from the common meeting point (TP) and meeting time (TZ) for the electric vehicle (1002), after a confirmation of the charging request at the common meeting point (TP) was transmitted to the charging vehicle (1005) via the software application (1004) and/or an exchange of data between the server and the mobile device and/or a data storage and/or an exchange of data within the software application at least partially using distributed ledger technology (DLT), in particular a block chain system, is carried out.

B3. The charging system (1001) according to example B1 or B2, characterized in that the common meeting point (TP) and the meeting time (TZ) are determined by the navigation apparatus (1051) of the mobile charging vehicle (1005) taking into account at least one previous route (BR) of the electric vehicle (1002) to be charged, wherein the software application (1004) transmits the previous route (BR) to the mobile charging vehicle (1005) with the charging request on the basis of correspondingly recorded position data.

B4. The charging system (1001) according to example B3, characterized in that the software application (1004) transmits to the charging vehicle (1005), in addition to the previous route (BR), also the route (GR) planned for the electric vehicle (1002) up to a route destination (RZ), and the navigation apparatus (1051) of the charging vehicle (1005) takes into account the planned route (GR) to calculate the common meeting point (TP) and the meeting time (TZ).

B5. The charging system (1001) according to one of the preceding examples B1 to B4, characterized in that the navigation apparatus (1051) of the charging vehicle (1005) automatically calculates the fastest route for the charging vehicle (1005) to the meeting point (TP) and displays it in the charging vehicle (1005) as a driving route (FRL).

B6. The charging system (1001) according to one of the preceding examples B1 to B5, characterized in that the navigation apparatus (1051) of the charging vehicle (1005) transmits the current position (P5) of the charging vehicle (1005) at least periodically to the software application (1004) for a retrieval in the electric vehicle (1002) on a path to the common meeting point (TP).

B7. The charging system (1001) according to example B6, characterized in that the software application (1004) is configured to display the current position (P5) of the charging vehicle (1005) on the way to the common meeting point (TP) on a navigation display in the electric vehicle (1002).

B8. The charging system (1001) according to one of the preceding examples B1 to B7, characterized in that the software application (1004) is configured to display all positions (P5) of all charging vehicles (1005) in order to enable a selection of a desired charging vehicle (1005) for charging the electric vehicle (1002).

B9. The charging system (1001) according to one of the above examples characterized in that the software application (1004) is configured to propose to the charging vehicle (1005) a meeting point (TP) and/or a common meeting time (TZ), which is adopted by the charging vehicle (1005) as common meeting point (TP) and common meeting time (TZ).

B10. The charging system (1001) according to one of the above examples B1 to B9, characterized in that the charging vehicle (1005) has an energy storage or battery storage (1052) of more than 300 kWh and at least one DC charging unit (1053) and at least one AC charging unit (1054).

B11. A method (1100) for dynamic charging of electric charging vehicles in a charging system according to one of the examples B1 to B10 comprising a software application (1004) installed and executed at least on a mobile device (1003) which comprises a navigation function or respectively connectable to a navigation apparatus (1022), and a plurality of mobile charging vehicles (1005) each having a navigation apparatus (1051), comprising the following steps:

transmitting (1110) current positions (P5) of each mobile charging vehicle (1005) of the charging system (1001) to the software application (1004) by the navigation apparatus (1051) of the charging vehicle (1005);

displaying (1120) at least the respective next mobile charging vehicle (1005) on the mobile device (1003) located in an electric vehicle (1002) by the software application;

transmitting (1130) by the software application a charging request for the electric vehicle (1002) and at least one current position (P2) of the electric vehicle (1002) to the displayed mobile charging vehicle (1005) in the case of an electric vehicle (1002) having an electric battery (1021) to be charged;

transmitting (1140) coordinates of a suitable common meeting point (TP) and a suitable meeting time (TZ) for charging the battery (1021) of the electric vehicle (1002) based on the received charging request to the mobile device (1003) in the electric vehicle (1002) to be charged by the navigation apparatus (1051) of the charging vehicle (1005); and Conversion (1150) by the software application (1004) of meeting point (TP) and meeting time (TZ) into navigation instructions for a driver of the electric vehicle to be charged (1002) by the software application (1004) for navigation of the electric vehicle (1002) to the common meeting point (TP).

B12. The method (1100) according to example B11, comprising the additional step of determining (1160) the common meeting point (TP) and the meeting time (TZ) taking into account at least one previous route (BR) of the electric vehicle (1002) to be charged from the navigation apparatus (1051) of the mobile charging vehicle (1005), wherein the software application (1004) has transmitted the previous route (BR) to the mobile charging vehicle (1005) together with the charging request on the basis of correspondingly recorded position data.

B13. The method (1100) according to example B12, wherein the software application (1004) transmits, in addition to the previous route (BR), also the route (GR) planned for the electric vehicle (1002) up to a route destination (RZ) to the charging vehicle (1005) and the navigation apparatus (1051) of the charging vehicle (1005) takes into account the planned route (GR) for calculating (1160) the common meeting point (TP) and the meeting time (TZ).

B14. The method (1100) according to one of the examples B11 to B13, comprising the additional step of at least periodically transmitting (1170) the current position (P5) of the charging vehicle (1005) on a path to the common meeting point by the navigation apparatus (1051) to the software application (1004) for a retrieval in the electric vehicle (1002).

B15. The method (1100) according to example B14, comprising the additional step of displaying (1180) the current position (P5) of the charging vehicle (1005) on its way to the common meeting point (TP) by the software application (1004) on a navigation display in the electric vehicle (1002).

B16. The method (1100) according to one of the examples B11 to B 15, wherein the software application (1004) displays all positions (P5) of all charging vehicles (1005) to enable selection of a desired charging vehicle (1005) for charging the electric vehicle (1002), followed by selecting (1190) one of the displayed charging vehicles (1005) as the charging vehicle (1005) for charging the battery (1021) of the electric vehicle (1002).

B17. A data storage product (1010) having a software application (1004) stored on the data storage product (1010), suitable for executing the steps of the method (1100) relating to the software application (1004) according to one of the examples B11 to B16.

The dynamic charging system described above may in particular comprise charging vehicles that have special energy storage devices, as explained below, to enable the electric vehicle to be charged. However, these energy storage devices described below can also be used in or comprise local or stationary charging stations, charging stations or charging stations.

These energy storage units for charging stations or charging vehicles have a control module for reception, disposal or forwarding of electrical energy between the power connections of the energy storage unit simultaneously with different voltage and power.

An electric vehicle with an electric drive is superior to an ordinary vehicle with a combustion engine in many respects. On top of that, electric cars are very suitable as emission-free vehicles, especially in urban areas. Compared to vehicles with combustion engines, however, current electric vehicles usually have much shorter ranges than vehicles with combustion engines due to the low charging capacities of the energy storage devices in the vehicle, typically batteries (accumulators/accumulators), and therefore need to be charged frequently. Nowadays, longer trips with electric vehicles still require charging planning. A charging station for electric vehicles is a charging station specially designed for electric vehicles. Its design is usually based on a petrol pump for conventional fuels. The proliferation of charging stations to promote electric mobility is an important element of the traffic turnaround. In order to increase the user-friendliness of electric vehicles, the aim is to achieve faster loading (electricity refueling). Charging times of one hour are technically easy to achieve, but are still far too long for the long-distance operation of electric vehicles. With so-called rapid charging stations, the electrical energy for over 150 kilometers (around 30 kWh) could be charged from the grid in 10 to 20 minutes into fast-chargeable vehicle batteries.

However, the current charging infrastructure is dependent on existing connections from the local power grid. The provision of very high currents for the parallel rapid charging of several vehicles is usually not possible due to the restrictions imposed by the public power grid (for example, the restriction of the available amount of electricity by the main fuse of the grid connection).

DE 10 2010 002 237 A1 discloses a method and device for electrical energy distribution in a charging station with several charging stations connected to an internal mains power supply of the charging station for parallel charging of several electric vehicles, where an intelligent control device is used to create a charging plan with staggered charging times for a plurality of electric vehicles in the charging station, which enables charging of the electric vehicles without overloading the internal mains power supply of the charging station and the connection to the public power grid. The intelligent control unit is arranged as an interface between the public power grid and the internal mains power supply. The intelligent control unit supplies the internal mains power supply with a single voltage, so that the charging stations of the charging station as a whole are instructing on the voltage and maximum transferable power for loading the electric vehicles.

Alternatively, to provide additional power, other local power sources such as wind or solar power plants can be connected to a charging station in addition to the public power grid, with a maximum transferable power per time unit adapted to the charging station's needs, in order to avoid overloading the public power grid during periods of high charging station load. However, these additional power sources supply the required current in a quantity that varies greatly over time in comparison to the public power grid, depending on the external conditions (wind strength, solar radiation) and additionally with other parameters, for example with different voltage such as low voltage, medium voltage or high voltage and/or a different waveform (direct voltage instead of alternating voltage).

Appropriate energy storage devices can be used to store the energy. The energy storage systems described below are particularly suitable for use in charging stations or charging vehicles that are simultaneously connected to low voltage as well as medium and high voltage as input sources and can flexibly supply a wide range of voltages from 230 volts to 50 kV as output sources. This enables the charging station to flexibly supply the electrical energy for a wide variety of electric vehicles without current limitation by the charging station with the respective optimal voltage and power.

This allows the operation of a charging station or charging vehicle that can process a wide variety of voltages as input voltages and deliver them flexibly to a wide range of consumers with different conditions and quantities.

Such an energy storage for charging stations comprises an energy storage unit and a control module connected to the energy storage unit at least with several supply power connections for reception of electrical energy and several output power connections for disposal of electrical energy, wherein the control module is designed for forwarding the electrical energy received via the supply power connections to the energy storage unit and/or to the output power connections as well as the electrical energy to be disposed of from the supply power connections and/or the energy storage unit via the output power connections to one or more charging columns for electric vehicles for demand-based disposal, wherein the control module comprises a plurality of appropriately controlled voltage transformers for enabling the reception, disposal or forwarding of electrical energy between the supply and output power connections simultaneously at different voltage and power, whereto the control module monitors the electrical energy arriving at the supply power connections and the electrical energy requested at the output power connections and adapts it appropriately to the respective demand by means of the voltage transformers.

The term "energy storage" refers to all reversibly chargeable energy storage devices that can provide a capacity and power input or power output suitable for loading an electric vehicle, for example for reception in the range of 230V to 50 kV, wherein the energy can be offered or taken as DC voltage and/or AC voltage.

The energy storage unit in the energy storage is the unit that stores the energy within the energy storage. For this purpose, the energy received via the supply power connections is converted by the control module of the energy storage into a voltage suitable for the respective energy storage unit for storage in the energy storage unit. The same applies to the disposal of energy from the energy storage unit to the output power connections. For example, the energy storage unit is a lithium iron phosphate battery with several battery cells or an arrangement of a number of such batteries.

The term "power connections" for supply and output of energy refers to all interfaces that are appropriate to be connected to a power cable in order to receive the power provided by it or dispensing it to the power cable. Power connections comprise plug connections or inductive connections for transferring power to or from the power cable. The electric connection(s) for connection to the public power grid are known to the skilled person, as well as the electric connections for connecting the energy storage to solar and/or wind power plants, which could for example supply medium voltage up to about 50 kV. The number of supply power connections and the number of output power connections can vary depending on the application. The power storage device according to the invention comprises at least two separate supply power connections and at least two separate output power connections, wherein at least one output power connection can also serve as a feedback connection for the public power grid.

The control module comprises voltage transformers in the form of one or more transformers and converters per supply power connection on the supply and output side for the appropriate reception, forwarding and disposal of energy at the differently offered supply currents or the differently required output currents and the corresponding simultaneous conversion within the control module from direct current to alternating current and vice versa as well as the adaptation of the voltage value or the voltage amplitude and corresponding control electronics for controlling the active components of the transformers and converters. During conversion, the energy storage unit can be used as a balancing unit to stabilize the conversion or to add missing energy or to receive excess energy. The control module comprises at least one processor unit and a memory, on which corresponding control programs are executed and stored in order to be able to control the demand-based forwarding of energy. The control program controls the voltage transformers accordingly.

The term "charging station" refers to all types of facilities that are capable of supplying several electric vehicles in parallel (simultaneously) and independently of the respective types of electric vehicles and their charging requirements with electrical energy with parameters for waveform (direct current or DC/alternating current or AC), voltage and power particularly suitable for the respective electric vehicles for charging their vehicle batteries without overloading the power cables or mains power supply. The term "demand-based disposal" refers to the dynamic adaptation of the form and quantity of energy delivered via the respective output power connections by the control module, so that the actual energy required for loading the electric vehicle(s) is always provided at the charging stations with optimized voltage and power values. At each output power connection, the dynamic control of the control module allows different voltages and outputs to be provided, individually adapted to the electric vehicle currently connected. The requirements for current and power defined by the conditions of the electric vehicle can be communicated to the control module by the type of plug-in connection or by input at a charging station or by appropriate Data communication between the control module and the electric vehicle, after which the control module provides current, power and waveform (DC or AC or DC voltage or AC voltage or AC) in the desired form with maximum possible power at the respective output power connection by means of its transformers and converters.

The energy storage for charging stations described here thus makes it possible to operate a charging station that can process a wide variety of voltages as input voltages very flexibly and supply them flexibly to a wide range of consumers with different conditions and quantities.

In one embodiment one of the supply power connections is designed to be connected to the public power grid, and one or more other of the supply power connections are configured for connection at least to a renewable energy source, preferably to a wind and/or solar power plant. The public power grid can ensure the basic supply of the charging station with charging current for the electric vehicles, while the renewable energy sources such as wind or solar energy serve on the one hand as additional energy sources for peak loads to avoid overloading the energy storage or the mains power supply of the charging station and on the other hand as $CO_2$-free energy sources to improve the energy mix.

In another embodiment at least one of the output power connections is configured for single-pole and/or three-pole connections for the disposal of direct current and/or alternating current. The output power connections can be for example single-phase 230V/10 A/2.3 kW connections, single-phase 230V/16 A/3.6 kW connections, three-phase 400V/16 A/11 kW connections, three-phase 400V/32 A/22 kW connections, three-phase 400V/63 A/43 kW connections, 230V/47 kW connections, charge type 1 connections, charge type 2 connections, CCS combo 1 connections, CCS combo 2 connections, CHAdeMO connections or Tesla 135 kW supercharger connections. The energy transfer can be done via cable connectors or inductively. Inductive energy transmission avoids wearing plug connections at the power connections. The charging power is an essential factor for the charging time. Alternating current connections of type 2 offer 11 kW or 22 kW. Higher power is offered by DC connections, where up to 50 kW is currently common for CHAdeMO and CCS. The output power connections according to the invention can offer up to 600 kW for the consumer (electric vehicle). A feed-back connection for the public power grid can be designed as a 20 kV connection. The output power connections in accordance with the invention supply electricity with a maximum charging capacity for all connected charging stations and therefore always enable the fastest possible charging time for the consumer, in this case the electric vehicle, whereby the charging time is only limited by the conditions of the consumer itself.

In another embodiment the control module is configured, in addition to forwarding electrical energy from the supply power connections to the output power connections for disposal of the electrical energy to the charging stations, to carry out a loading test in at least one supply network connected to the output power connections and, if required, to provide additional electrical energy from the energy storage unit for the respective supply network. This prevents overloading on the supply power connections and output power connections as well as in the mains power supply between charging station and energy storage.

In another embodiment the control module is equipped with one or more load sensors for loading testing in the respective connected mains power supply. Here current transformers can be used as alternating current sensors or direct current sensors like Hall probes, sensors with reed switches or thermal sensors. Provided that all mains power supplies are monitored with load sensors, the control module of the invented energy storage can detect an overload in all mains power supplies and react to it with an appropriate current control.

In another embodiment the control module is designed, in the event of no overloading of the mains power supply is detected by the loading test, to forward at least part of the electrical energy received via the supply power connections to the energy storage unit. Thus, the energy storage unit can be charged in preparation for any additional energy that may be required for simultaneous loading of electric vehicles, so that this energy can actually be made available to the output power connections if required.

In another embodiment the control module is configured to control the reception, disposal or forwarding of electrical energy between supply power connections, energy storage unit and output power connections on the basis of received meteorological data and statistically determined consumption parameters of energy. This not only takes into account the current situation at the supply and output power connections for the control of the energy storage, but also ensures a sufficiently large amount of energy stored in the energy storage module for times of low supply by the renewable energy sources in order to be able to provide the output power connections with energy in addition to the supply from the public power grid if required.

In another embodiment the energy storage further comprises at least one hydrogen storage connected to at least one fuel cell for generating electrical energy connected to at least one of the supply power connections. Thus, the energy storage has another source of energy to provide additional energy.

In another embodiment the energy storage additionally comprises at least one electrolyzer connected to the hydrogen storage(s), which is supplied with electricity by means of the control module for electrolysis of water for the production of hydrogen, which is subsequently stored in the hydrogen storage(s). Thus, in conjunction with the fuel cell, hydrogen storage not only represents an additional energy source, but can also be used as an energy storage system for the intermediate storage of energy in the form of hydrogen in the event of an oversupply of electrical energy, where part of it is used for the electrolysis of water. If the hydrogen in the electrolyzer is not produced from water but from another raw material, this is also included in the invention.

In another embodiment the control module automatically determines a suitable storage amount in the energy storage unit and in the hydrogen storage unit(s) according to the meteorological data and consumption parameters and adapts filling levels in the energy storage unit and/or in the hydrogen storage unit(s) accordingly by means of energy storage or hydrogen production or their respective consumption, for example by considering the weather forecast of the last 24 hours. This is a particularly reliable way of ensuring that sufficient energy is stored in the energy storage system to cover the power requirements for loading electric vehicles at all times, independently of the energy fed in from the public power grid and other energy sources. This also eliminates the need for manual determination of requirements and operation of the hydrogen storage or fuel cell. By combining solar and wind power with hydrogen-based energy storage, the share of "green" energy in the power supply of electric vehicles can be significantly increased on a local basis. Even with few reconversions of the energy, this type of power supply would be cheaper than via the grid connection to the public power grid.

In another embodiment the energy storage unit comprises at least one or more energy storage unit elements, such as battery storage, appropriately connected to the control module. A battery storage can be charged and discharged reversibly and with low losses and is able to store energy over longer periods with low losses. Likewise, the small space requirement of battery storage allows a compact design of the energy storage, especially of the energy storage unit. The battery storage can comprise a capacity between 600 kWh and 5 MWh, wherein the battery storage can be operated modularly with a multitude of battery cells.

In the following further a charging station, which especially can be designed as charging vehicle of before described dynamic charging system, for charging several electric vehicles in parallel, comprising several charging columns interconnected via one or more mains power supplies of the charging station and at least one energy storage according to the invention, which is connected to the charging columns for disposal of electrical energy via the internal mains power supply(s) and is connected at least to the public power grid for reception of electrical energy. The mains power supply of the charging station is separate from the public power grid only on the output side of the control module and is connected to the general power grid and, if necessary, to other renewable energy sources only via the control module. Depending on the embodiment, the charging station can have, for example, eight AC/DC power columns as charging stations, at which, depending on the specifications of the electric vehicle, an output of 12 kW up to 200 kW is available for loading the electric vehicle. The charging stations can be designed in such a way that the charging plugs of the electric vehicles can be connected to the charging stations either directly or with an adapter. In addition, the charging station can be equipped with one or more high-performance charging stations with up to 600 kW for small or large vans, heavy goods vehicles or buses. Small charging stations can also comprise fewer charging points, for example four charging points with an output of 12 kW to 200 kW. The number of charging points is freely scalable, as is the capacity of the energy storage for additional supply of the charging points in conjunction with the supply from the public power grid. As a charging station, the charging station can be upgraded with up to 50 charging columns. The charging columns can be connected to the control module via data lines in order to transfer the desired (favorable) charging parameters to the control module after recognizing the required charging parameters for the respective electric vehicle (e.g. by recognizing the charging cable, by near field communication with the electric vehicle, by input by the user of the electric vehicle), so that the control module provides the energy demand-based by controlling the voltage transformers at the corresponding output power connections.

Thanks to the previously described energy storage, the charging station is independent of the type of electric vehicle, whether it requires alternating or direct current. Due to this energy storage, the charging station can therefore process a wide variety of voltages as input voltages and supply them flexibly to a wide range of consumers with different conditions and quantities. When choosing the charging station or charging vehicle, it is no longer necessary to distinguish whether the electric vehicle requires direct or alternating current. The charging station or charging vehicle can be adapted to the respective voltage or supply both.

Furthermore, at the charging station or charging vehicle, especially at the respective charging station or the respective output power connection, especially depending on the type of the connected charging cable, which is especially detected automatically, voltages of up to 1000V in different amperages, are provided for different charging capacities, such as from 22 kW-AC to 600 kW DC.

In one embodiment of the charging station, the charging station further comprises a wind and/or solar power plant, which are connected to the internal mains power supply via respective supply power connections and via the energy storage. Such a charging station improves the $CO_2$ balance when loading electric vehicles by using $CO_2$-free energy sources and ensures a constant and reliable energy supply for the charging stations via the further connected public power grid and energy storage.

In a further embodiment of the charging station one or more load sensors are connected to the mains power supply system(s) and connected to the control module of the energy storage. Therewith the control module can perform a loading test in the respective mains power supply system and, if necessary, provide additional electrical energy from the energy storage unit for the respective mains power supply system in order to avoid overload on the part of the supply power connections.

In a further embodiment the charging station is equipped to at least receive meteorological data and to transmit this meteorological data to the control module so that the control module can very effectively control the reception, disposal or forwarding of the electrical energy between supply power connections, energy storage unit and output power connections on the basis of the meteorological data and/or statistically determined consumption parameters of energy. In a preferred embodiment the charging station comprises a weather station for receiving the meteorological data. The weather station is a combination of different measuring instruments, which are used for the measurement of meteorological parameters and thus for weather observation at the location of the charging station. A digital weather station offers the advantage that it can forward meteorological data from the corresponding sensors to an evaluation unit via data transmission, which can be located in the weather station or in the control module, for example. The sensors are attached to the desired measuring points, where they can collect data and transmit it for further processing.

In a further embodiment of the charging station at least one of the output power connections is designed as a refeed connection for the public power grid. Through this refeed connection, excess electricity can be fed into the public power grid, whereby on the one hand refeed revenues can be achieved and on the other hand the public power grid can be additionally stabilized with appropriate feed-in.

A method for operating a charging station for parallel charging of several electric vehicles comprising several charging columns connected to each other via a mains power supply of the charging station and at least one energy storage as described above comprising an energy storage unit and a control module connected to the energy storage unit at least with several power supply units for reception of electrical energy and several output power connections for disposal of electrical energy, wherein the energy storage is connected to the charging columns for disposal of the electrical energy via the internal mains power supply and is at least connected to the public power grid for reception of the electrical energy is designed so that the control module can carry out the following steps:

forwarding the electrical energy received via the supply power connections to the energy storage unit and/or to the output power connections;

monitoring the electrical energy arriving at the supply power connections and the electrical energy requested at the output power connections;

receiving, disposing or forwarding the electrical energy between the supply and output power connections simultaneously with different voltage and power by appropriately controlled voltage transformers in the control module; and demand-based dispensing of electrical energy by means of forwarding the electrical energy to be dispensed from the supply power connections and/or the energy storage unit via the output power connections to the mains power supply for supplying the charging stations.

This method makes it possible to operate a charging station that can very flexibly process different voltages as input voltages and deliver them flexibly to a wide range of consumers with different conditions and quantities.

In an embodiment the method comprises additionally the further steps:

Carrying out a loading test in the mains power supply by means of one or more load sensors, which are arranged at an appropriate place in the mains power supply;

providing additional electrical energy from the energy storage unit to the mains power supply on demand to avoid overload on the supply power connections side; and Forward at least part of the electrical energy received via the supply power connections to the energy storage unit if the loading test did not detect any overload of the mains power supply.

In a further embodiment the method comprises additionally the further step of controlling the reception, disposal or forwarding of the electrical energy between supply power connections, energy storage unit and output power connections on the basis of received meteorological data and statistically determined consumption parameters at the charging stations.

In a further embodiment of the method, wherein the energy storage is further connected to at least one hydrogen storage connected to at least one fuel cell for the generation of electrical energy attached to at least one of the supply power connections and an electrolyzer attached to the hydrogen storage (s), wherein the electrolyzer is supplied with electricity by means of the control module for electrolysis of water which is subsequently stored in the hydrogen storage device(s), the method further comprising the further steps:

automatically determining a storage amount in the energy storage unit and in the hydrogen storage(s) that is appropriate according to the meteorological data and consumption parameters; and corresponding adaptation of the filling levels in the energy storage unit and/or in the hydrogen storage unit(s) by means of energy storage or hydrogen production or their respective consumption.

The energy storage, as described above, is characterized in particular by the fact that the control module can be used to change or control the ratio of the total power of the energy storage unit in relation to the power delivered via the charging columns or the output power connections, which is determined in particular by the type of the respective charging cable of the electric vehicle.

The control module can also distribute or control voltages arriving at the supply power connections to the energy storage unit or individual energy storage unit elements, such as battery storage, and electrolyzers of hydrogen storages in such a way that they are adapted to the capacity of the energy storage, especially the energy storage unit or the individual energy storage unit elements or electrolyzers. The individual energy storage unit elements and electrolysers can be connected in series or parallel.

The use of hydrogen storages allows, for example, when the supply power at the supply power connections, in particular of the public power grid, is higher, the entire available power can be used to supply both the energy storage unit and the output power connections with energy and to produce a reserve for situations in which the supply power is lower. This reserve is created by using power not supplied to the energy storage unit or the output power connections to generate hydrogen by means of electrolysers and storing it temporarily in pressurized tanks. If the grid output is too low, the energy storage unit or the output power connections can be supplied with energy for loading or disposal by converting the hydrogen into electrical energy.

The previously described energy storage can be realized according to the following illustrations, wherein this realization can be realized additionally or independently of the claimed digital access system and/or the previously described system for dynamic charging.

V1. An energy storage (2001) for charging stations (2010) comprising an energy storage unit (2011) and a control module (2012) connected to the energy storage unit (2011) at least with several supply power connections (2013) for reception (E) of electrical energy and several output power connections (2014) for disposal (A) of electrical energy, wherein the control module (2012) is designed for forwarding (W) the electrical energy received via the supply power connections (2013) to the energy storage unit (2011) and/or to the output power connections (2014) as well as the electrical energy to be disposed of from the supply power connections (2013) and/or the energy storage unit (2011) via the output power connections (2014) to one or more charging columns (2002) for electric vehicles for demand-based disposal, wherein the control module (2012) comprises a plurality of appropriately controlled voltage transformers for enabling the reception, disposal or forwarding (E, A, W) of electrical energy between the supply and output power connections (2013, 2014) simultaneously at different voltage and power, whereto the control module (2012) monitors the electrical energy arriving at the supply power connections (2013) and the electrical energy requested at the output power connections (2014) and adapts it appropriately to the respective demand by means of the voltage transformers.

V2. The energy storage (2001) according to illustration V1, characterized in that one of the supply power connections (2013) is designed to be connected to the public power grid (2031), and one or more other of the supply power connections (2013) are configured for connection at least to a renewable energy source (2032, 2033), preferably to a wind and/or solar power plant (2032, 2033).

V3. The energy storage (2001) after illustration V1 or V2, characterized in that at least one of the output power connections (2014) is configured for single-pole and/or three-pole connections for the disposal of direct current and/or alternating current.

V4. The energy storage (2001) according to one of the above illustrations V1 to V3, characterized in that the control module (2012) is configured, in addition to forwarding (W) electrical energy from the supply power connections (2013) to the output power connections (2014) for disposal (A) of the electrical energy to the charging stations (2002), to carry out a loading test in at least one supply network (2004) connected to the output power connections and, if required, to provide additional electrical energy from the energy storage unit (2011) for the respective supply network (2004) in order to avoid overload on the side of the supply power connections (2013).

V5. The energy storage (2001) according to illustration V4, characterized in that the control module (2012) is equipped with one or more load sensors (2015) for loading testing in the respective connected mains power supply (2004).

V6. The energy storage (2001) according to illustration V4 or V5, characterized in that, in the event of no overloading of the mains power supply (2004) is detected by the loading test, the control module (2012) is designed to forward (W) at least part of the electrical energy (E) received via the supply power connections (2013) to the energy storage unit (2011).

V7. The energy storage (2001) according to one of the preceding illustrations V1 to V6, characterized in in that the control module (2012) is configured to control the reception, disposal or forwarding (E, A, W) of electrical energy between supply power connections (2013), energy storage unit (2011) and output power connections (2014) on the basis of received meteorological data (WD) and statistically determined consumption parameters (VP) of energy.

V8. The energy storage (2001) according to one of the preceding illustrations V1 to V7, characterized in that the energy storage (2011) further comprises at least one hydrogen storage (2016) connected to at least one fuel cell (2017) for generating electrical energy connected to at least one of the supply power connections (2013).

V9. The energy storage (2001) according to illustration V8, characterized in that the energy storage (2011) additionally comprises at least one electrolyzer (2018) connected to the hydrogen storage(s) (2016), which is supplied with electricity by means of the control module (2012) for electrolysis of water, which is subsequently stored in the hydrogen storage(s) (2016).

V10. The energy storage unit (2001) according to illustration V9, characterized in that the control module (2012) automatically determines a suitable storage amount in the energy storage unit (2011) and in the hydrogen storage unit(s) (2016) according to the meteorological data (WD) and consumption parameters (VP) and adapts filling levels in the energy storage unit (2011) and/or in the hydrogen storage unit(s) (2016) accordingly by means of energy storage or hydrogen production or their respective consumption.

V11. The energy storage unit (2001) according to one of the above illustrations V1 to V10, characterized in that the energy storage unit (2011) comprises at least one or more energy storage unit elements, such as battery storage (2111), appropriately connected to the control module.

V12. A charging station (2010) for charging several electric vehicles (2005) in parallel, comprising several charging columns (2002) interconnected via one or more mains power supplies (2004) of the charging station (2010) and at least one energy storage (2001) according to one of the illustrations V1 to V11, which is connected to the charging columns (2002) for disposal (A) of electrical energy via the internal mains power supply(s) (2004) and is connected at least to the public power grid (2031) for reception (E) of electrical energy.

V13. The charging station (2010) according to illustration V12, characterized in that the charging station (2010) further comprises a wind and/or solar power plant (2032, 2033), which are connected to the internal mains power supply (2004) via respective supply power connections (2013) and via the energy storage (2001).

V14. The charging station (2010) according to one of the illustrations V12 or V13, characterized in that one or more load sensors (2015) are connected to the mains power supply system(s) (2004) and connected to the control module (2012) of the energy storage (2001) so that the control module (2012) can perform a loading test in the respective mains power supply system (2004) and, if necessary, provide additional electrical energy from the energy storage unit (2011) for the respective mains power supply system (2004) in order to avoid overload on the part of the supply power connections (2013).

V15. The charging station (2010) after one of the illustrations V12 to V14, characterized in in that the charging station (2010) is equipped to at least receive meteorological data (WD) and to transmit this meteorological data (WD) to the control module (2012) so that the control module (2012) can control the reception, disposal or forwarding (E, A, W) of the electrical energy between supply power connections (2013), energy storage unit (11) and output power connections (2014) on the basis of the meteorological data (WD) and/or statistically determined consumption parameters (VP) of energy.

V16. The charging station (2010) according to illustration V15, characterized in that the charging station (2010) comprises a weather station (2020) for receiving the meteorological data (WD).

V17. The charging station (2010) according to one of the illustrations V12 to V15, characterized in that at least one of the output power connections (2014) is designed as a refeed connection for the public power grid (2031).

V18. A method (2100) for operating a charging station (2010) for parallel charging of several electric vehicles (2005) comprising several charging columns (2002) connected to each other via a mains power supply (2004) of the charging station (2010) and at least one energy storage (2001) according to one of the illustrations V1 to V11 comprising an energy storage unit (2011) and a control module (2012) connected to the energy storage unit (2011) at least with several power supply units (2002) for reception (A) of electrical energy and several output power connections (2014) for disposal (A) of electrical energy, wherein the energy storage (2001) is connected to the charging columns (2002) for disposal (A) of the electrical energy via the internal mains power supply (2004) and is at least connected to the public power grid (2031) for reception (E) of the electrical energy, the control module (2012) carrying out the following steps:

forwarding (2110) the electrical energy received via the supply power connections (2013) to the energy storage unit (2011) and/or to the output power connections (2014);

monitoring (2120) the electrical energy arriving at the supply power connections (2013) and the electrical energy requested at the output power connections (2014);

receiving, disposing or forwarding (2130) the electrical energy between the supply and output power connections (2013, 2014) simultaneously with different voltage and power by appropriately controlled voltage transformers in the control module (2011); and demand-based dispensing (2140) of electrical energy by means of forwarding (W) the electrical energy to be dispensed from the supply power connections (2013) and/or the energy storage unit (2011) via the output power connections (2014) to the mains power supply (2004) for supplying the charging stations (2002).

V19. The method (2100) according to illustration V18, additionally comprising the further steps:

Carrying out (2150) a loading test in the mains power supply (2004) by means of one or more load sensors (2015), which are arranged at an appropriate place in the mains power supply (2004);

providing (2160) additional electrical energy from the energy storage unit (2011) to the mains power supply (2004) on demand to avoid overload on the supply power connections (2013) side; and Forward (2170) at least part of the electrical energy received via the supply power connections (2013) to the energy storage unit (2011) if the loading test did not detect any overload of the mains power supply (2004).

V20. The method (2100) according to illustration V18 or V19, additionally comprising the further step:

controlling (2180) the reception, disposal or forwarding of the electrical energy between supply power connections, energy storage unit and output power connections on the basis of received meteorological data and statistically determined consumption parameters at the charging stations.

V21. The method (2100) according to illustration V20, wherein the energy storage (2001) further comprises at least one hydrogen storage (2016) connected to at least one fuel cell (2017) for the generation of electrical energy attached to at least one of the supply power connections (2013) and an electrolyzer (2018) attached to the hydrogen storage (2016) (s), wherein the electrolyzer (2018) is supplied with electricity by means of the control module (2011) for electrolysis of water which is subsequently stored in the hydrogen storage device(s) (2016), further comprising the further steps:

automatically determining (2190) a storage amount in the energy storage unit (2011) and in the hydrogen storage(s) (2016) that is appropriate according to the meteorological data (WD) and consumption parameters (VP); and corresponding adaptation (2200) of the filling levels in the energy storage unit (2011) and/or in the hydrogen storage unit(s) (2016) by means of energy storage or hydrogen production or their respective consumption.

The dynamic charging system or energy storage described above allows, in particular in combination with the digital access system, to carry out loading operations which do not require the presence of the user of the vehicle to be loaded, for example recharging when the vehicle to be loaded has been parked by the user.

For example, a request for a night loading can be made by a user of a vehicle to be loaded, who is in particular a registered customer of the dynamic loading system. The digital access system, in particular in connection with the dynamic charging system, enables access to the vehicle to be loaded with the code at any time within a time window. The code is generated in particular upon acceptance of the order confirmation by the user. The code makes it possible to activate the unlocking unit via the activation unit in order to be able to activate or open, for example, the filler flap or another suitable mechanism on the vehicle to be loaded via the access unit, as well as the systems necessary for loading the vehicle, such as at least partially the electrical operating system.

This then makes it possible to connect the vehicle to be loaded with the charging vehicle that has arrived at the vehicle to be loaded via a rendezvous system and carry out the loading.

Loading is completed when the filler flap is closed or, alternatively, when the charging cable is removed or the activation of the vehicle to be loaded is switched off. The access code is advantageously invalidated automatically, especially by the dynamic charging system, and it is not possible to access again with this code. Furthermore, the vehicle is advantageously returned automatically to the idle state, i.e. the systems activated by the access unit are deactivated again.

It is also possible that an access code allows access only during a limited time window, for example between 10 p.m. and 6:30 a.m. An access code not used during this time window can then also be invalidated automatically.

It should be emphasized that the unlocking unit does not allow general access to the entire vehicle or all systems of the vehicle, but only provides defined authorizations, such as access to the tailboard, while other authorizations, such as access to the interior, operation of systems such as lighting, ignition or similar, are not granted. The unlocking unit thus allows the use of certain systems of the vehicle to be loaded at a specific time and for a limited period of time without influencing other systems or being able to enter the vehicle.

For carrying out a loading without the presence of the user of the vehicle to be loaded, it is especially intended that, particularly by the access unit based on the access code, a digital access to the power storage of the vehicle to be loaded is granted in order to be able to determine a necessary loading quantity.

In addition or alternatively, this loading quantity can be determined manually by the user of the vehicle to be loaded, in particular via a predefined quantity grid, for example if access is not possible for technical reasons or is not desired by the user.

Furthermore, the dynamic charging system and/or the digital access system allows, in particular during an order period, like between 10 p.m. and 6:30 a.m., access to a position location system, for example a navigation system of the vehicle to be charged, in particular to be able to determine the location of the vehicle in detail, for example for a rendezvous with the charging vehicle.

It is preferably intended in the dynamic charging system, in particular the software application, that all data relevant to charging, in particular the possible charging speed, can be retrieved.

In particular by means of the dynamic charging system but basically also by other charging systems, an order for a night charge can come about as follows and trigger the following processes.

The user of the vehicle registers a night charge request via the mobile application or the software application. Preferably this is done before the beginning of a defined time window, such as 22:00 to 6:30. The vehicle intended for loading is parked at an agreed location, especially during the time window, or the location of the vehicle is determined or recorded as described above before loading is carried out. Alternatively or in addition, if the vehicle is not yet at its final location at the beginning of the time window, the user can correct the exact location data.

The software application in particular is then used to determine the required charging quantity by means of a scan of the vehicle's energy storage or by means of the manually entered quantity. Based on this data, the software application in particular calculates the feasibility using existing charging orders and the position of the vehicles to be charged. The aforementioned order confirmation is then offered to the user of the vehicle.

The prerequisite for a corresponding offer are further environmental parameters, such as whether loading is feasible at all at the desired location due to traffic law or other regulatory restrictions and/or whether the location can be reached by the charging vehicle at all.

Furthermore, the order confirmation is planned in dependence, in particular, on the expected required loading time, the required travel time and thus the total time required for each individual loading, and in particular its compatibility with other reloading requests is determined.

In the background, the confirmation contains the access code which is encrypted in particular via DLT or block chain technology. This access code can be activated by accepting the order confirmation and, in particular, forwarded automatically via the software application to the vehicle to be loaded and the charging vehicle.

Thus the unlocking unit of the vehicle to be loaded can be updated once for the fixed time window by means of the access code via the activation unit of the charging vehicle.

In order to be able to determine all these data we need a special data package, which can only be scanned directly via our activation unit with regard to current data, recurring permanent data are deposited with the customer.

BRIEF DESCRIPTION OF THE FIGURES

These and other aspects of the invention concerning the digital access system are shown in detail in the figures below.

Furthermore, the description comprises the following figures, by means of which further aspects of the dynamic charging system described above are explained.

Figure 4:
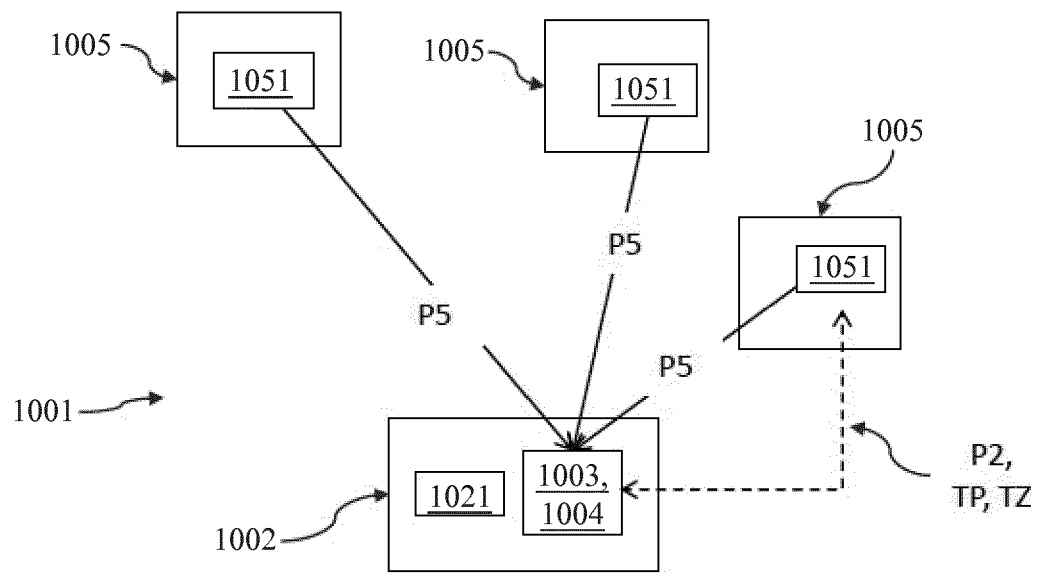
Figure 5:
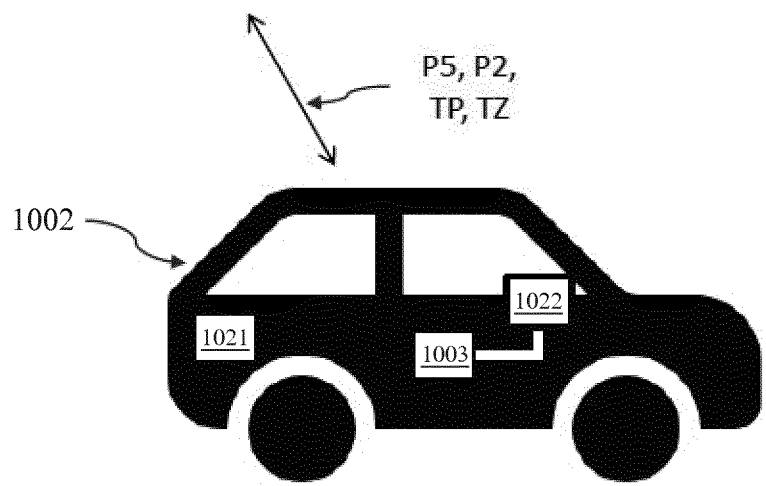
Figure 6:
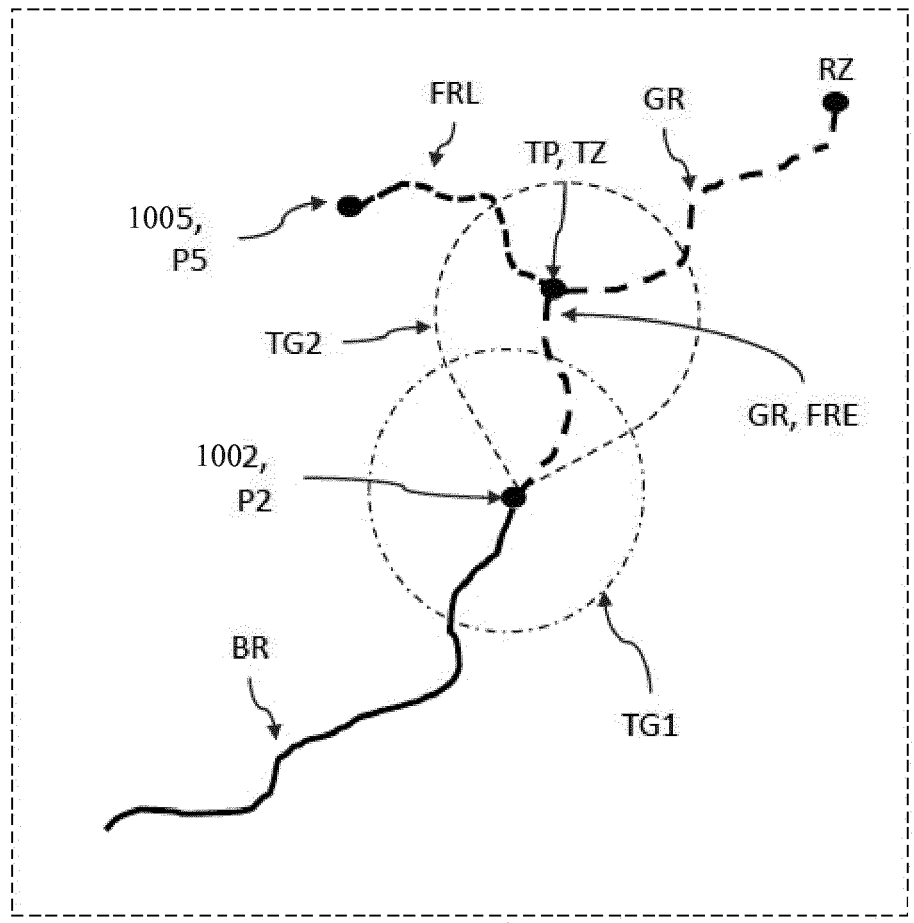
Figure 7:
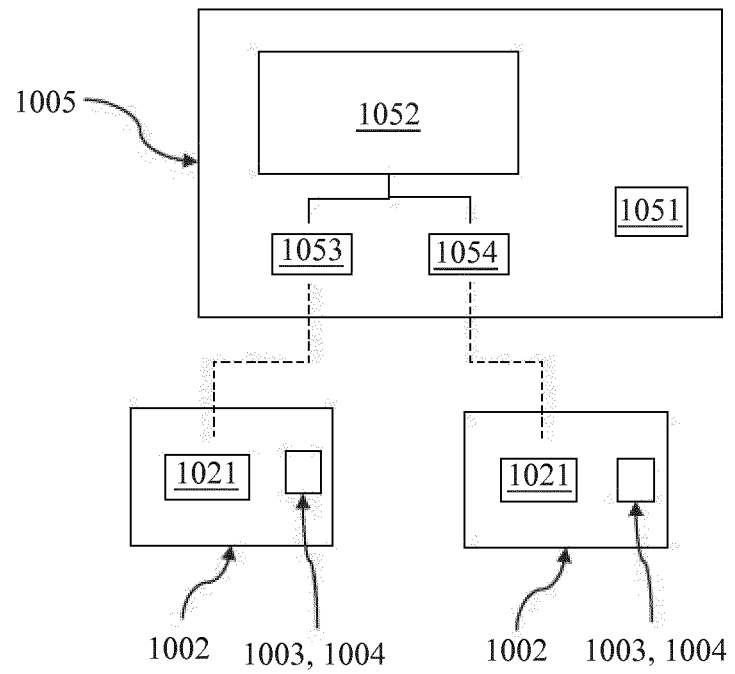
Figure 8:
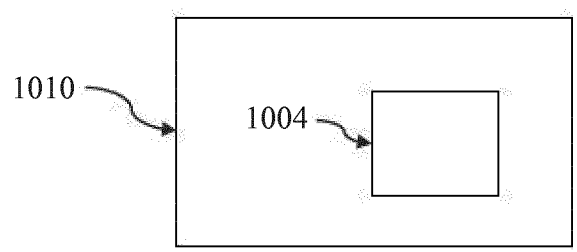

FIG. 4: Schematic representation of an embodiment of the dynamic loading system;

FIG. 5: Schematic representation of an embodiment of the electric vehicle with mobile device and software application for the dynamic charging system installed on it according to the invention;

FIG. 6: Schematic representation of the calculation of the common meeting point based on position and movement data of the electric vehicle;

FIG. 7: Schematic representation of the charging vehicle of the dynamic charging system;

FIG. 8: Schematic representation of the data storage product with software application stored thereon for carrying out the dynamic charging system; and FIG. 9: Schematic representation of an embodiment of the method for the dynamic charge.

Finally, the description includes the following figures, by means of which further aspects of the previously described energy storage are explained.

Figure 10:
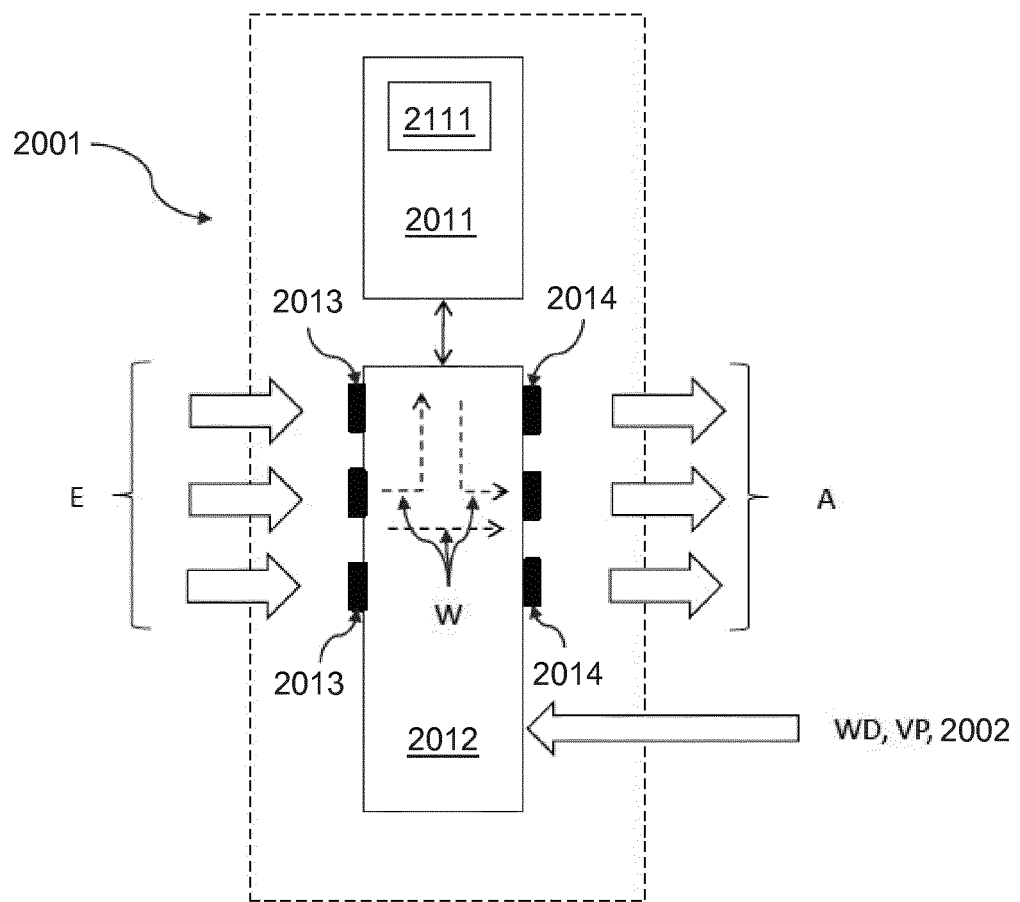
Figure 11:
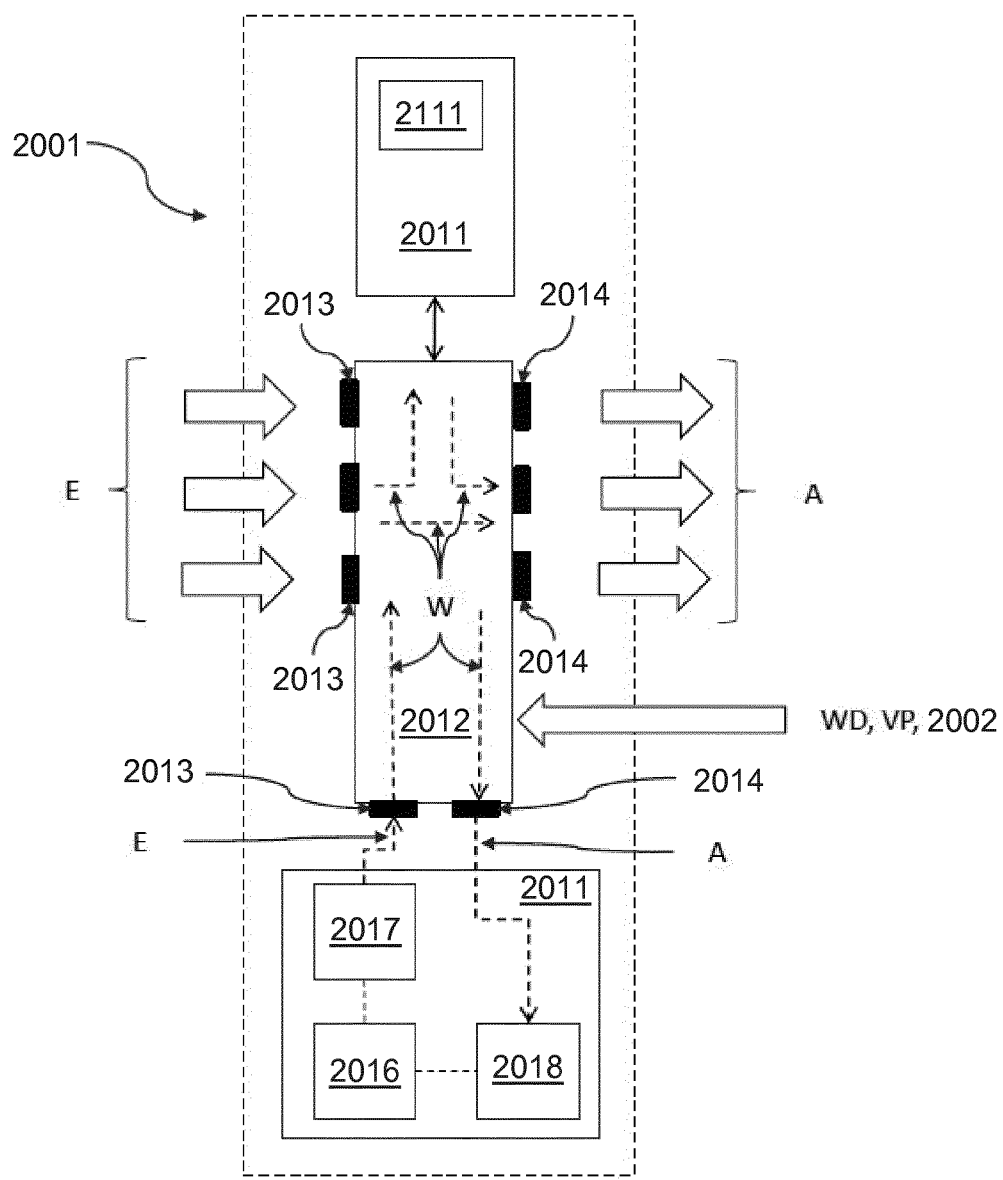
Figure 12:
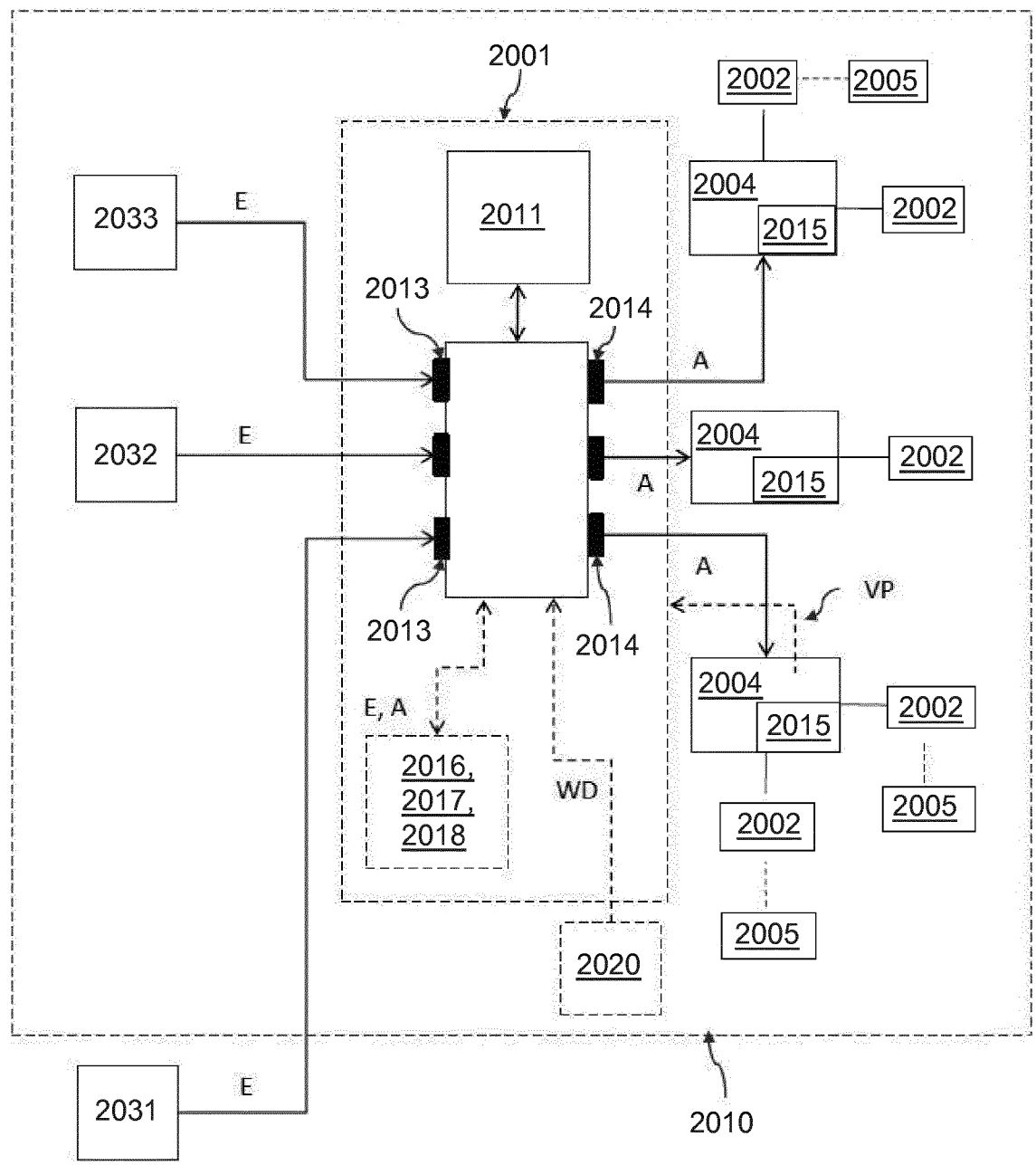
Figure 13:
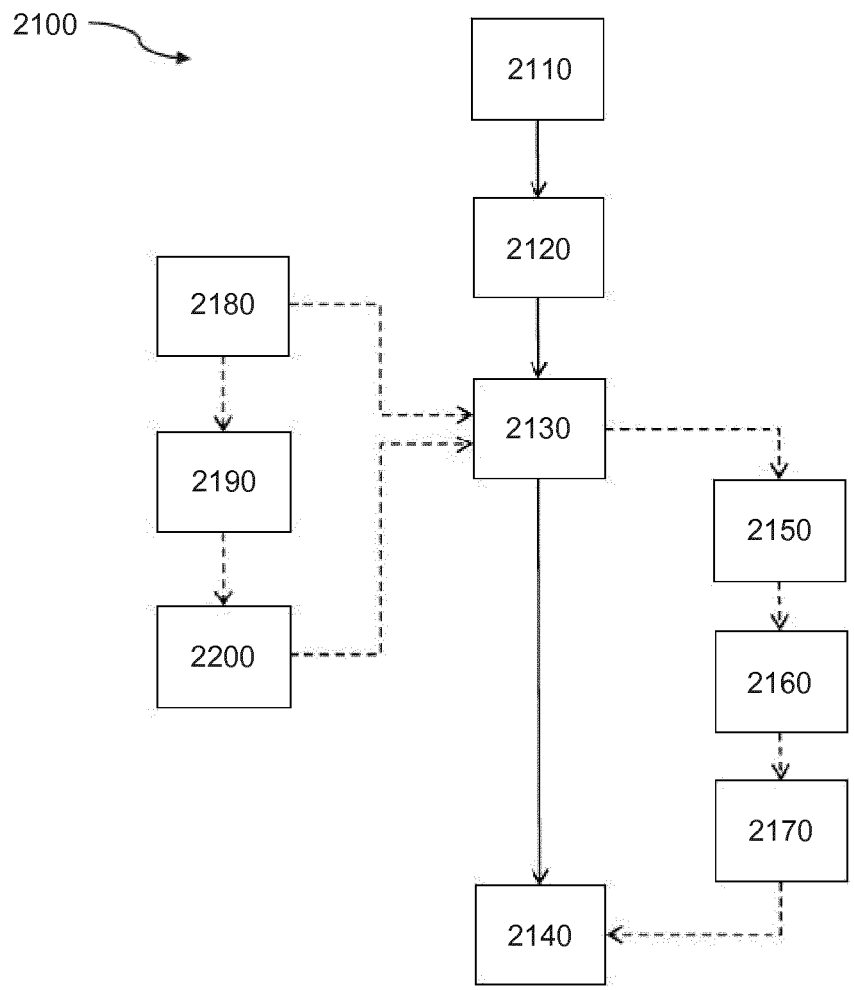

FIG. 10: Schematic representation of an embodiment of the energy storage method according to the invention;

FIG. 11: Schematic representation of another embodiment of the energy storage with hydrogen storage, fuel cell and electrolyzer;

FIG. 12: Schematic representation of an embodiment of the charging station with the energy storage system as described above, in particular implemented in one;

FIG. 13: Schematic representation of an embodiment of the method according to the invention for operating a charging station.

DETAILED DESCRIPTION OF THE EMBODIMENTS

Figure 1:
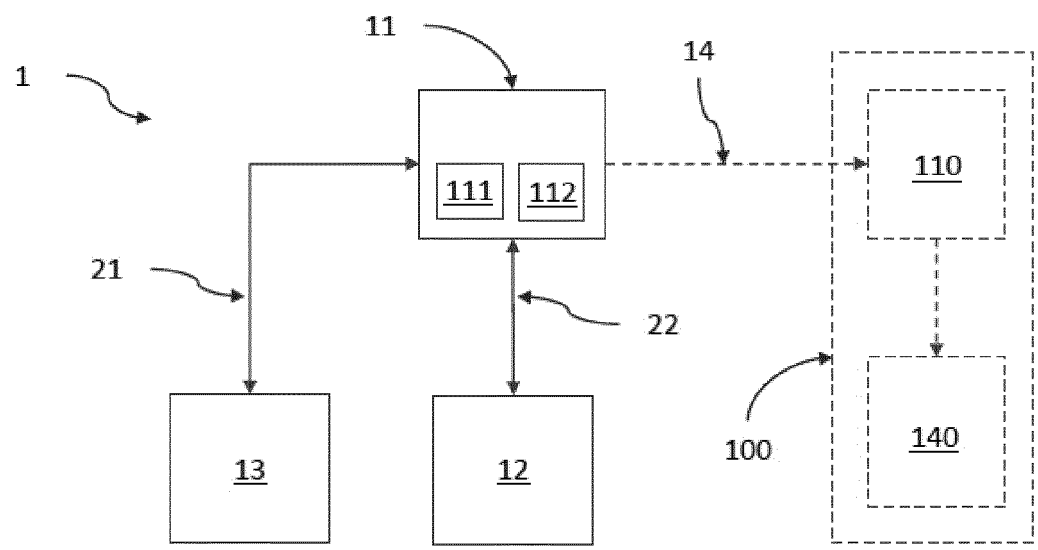
FIG. 1: schematic representation of an embodiment of the access system according to the invention.

FIG. 1 shows a schematic representation of an embodiment of the access system 1 according to the invention for installation in a vehicle 100 with a locking system and for appropriate connection to a system controller 110 of the vehicle 100 (therefore shown dashed), wherein the access system 1 comprises an unlocking unit 11 for positioning in the vehicle 100 as well as an access unit 12 and an activation unit 13 for use outside the vehicle 100. In other embodiments, several activation and access units can be used for the same vehicle 100. The activation unit 13 (e.g. a mobile terminal, smartphone, tablet PC, a website on the Internet, etc.) activates the unlocking unit 11 permanently or for a limited period of time, e.g. a predetermined period, by means of wireless data communication 21. The access unit 12 then arranges access arranging signals 14 to the vehicle 100 from the outside by means of an independent wireless data communication 22 separate to the previous data communication 21 via the previously activated receiving unit 11, wherefore the unlocking unit 11 transmits in response to the data communication 22 access arranging control signals 14 to the system controller 110 for controlling the locking system and releasing at least one locking component 140 to allow access to the vehicle for its load. Data communication can be carried out via radio, WLAN or near-field communication, preferably RFID, wherefore the unlocking, activation and access units are configured with appropriate transmitter and/or receiver modules. Data communication 21, 22 can also be encrypted. The unlocking unit 11 here also includes a processor unit 111 with memory 112, on which data for authorization of the activation unit 13 and/or the access unit 12 are stored. The processor unit 111 is configured to carry out an authorization check for the activation and access units based on this data. Here, the access unit 12 can, for example, transmitting an identification code to the unlocking unit 11, on the basis of which the unlocking unit 11 carries out the authorization check. The activation unit 11 can be configured to send out signals for the scan for available access units 12 when activated. The access unit 12 can be a transponder (active or passive) which transmits the identification code to the unlocking unit 11 after receiving the Data communication 22 from the unlocking unit 11. The unlocking unit 11 may also include appropriate interfaces for connection to the system controller 110 of the vehicle 100 so that it can be reversibly positioned in the vehicle. The access system 1 may further comprise a background computer system (not explicitly shown here) configured to enable at least registration of users 3 and entry of data of the vehicles 100 and/or the unlocking units 11 and/or the access units 12 and/or the activation units 13 and their assignment to the vehicles 100 and/or users 3 and to carry out an appropriate transfer of data to the unlocking unit 11 at least to enable an authorization check by the unlocking unit 11.

Figure 2:
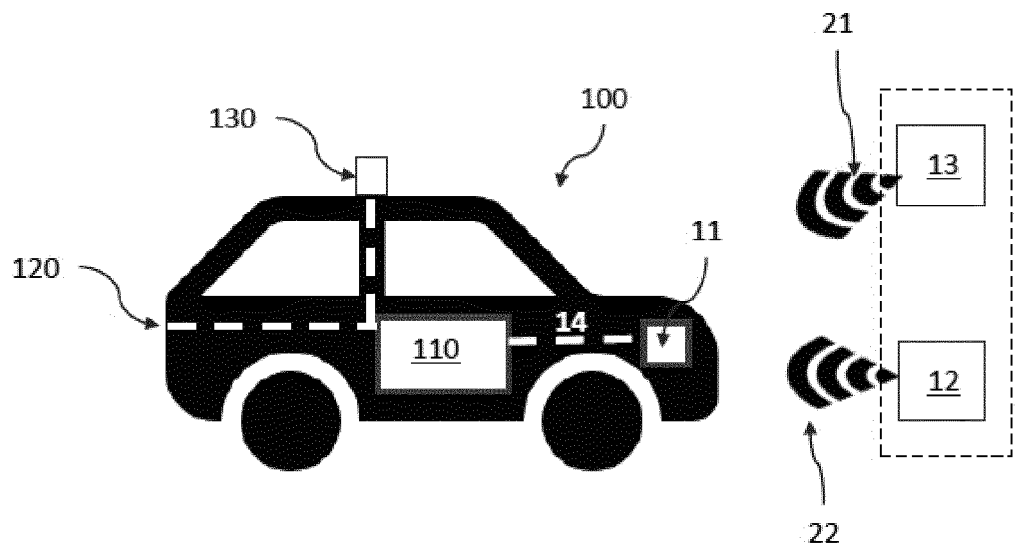
FIG. 2: Schematic representation of an embodiment of the vehicle according to the invention with an access system according to the invention.

FIG. 2 shows a schematic representation of an embodiment of the vehicle according to the invention 100 with access system 1 according to FIG. 1. The vehicle 100 comprises a locking system (not shown explicitly here) and a control unit 110 for controlling the locking system, among other things. The digital access system 1 comprises an access unit 12 and an activation unit 13, which are used outside the vehicle to activate the unlocking unit 11 and for arranging access from outside the vehicle. The access unit 12 and the activation unit 13 can be two separate devices or, in another embodiment, they can be integrated into a common device as indicated by the dashed rectangle. In order that this access can be granted and released, an unlocking unit 11 is positioned in the vehicle 100 and connected to the control unit 110 in an appropriate way in order to allow access to the vehicle to its loading by controlling the locking system and activating at least one locking component 140. For improved data communication 21, 22, the activation unit 11 is here connected to the receiving aerial 130 of the vehicle 100 (shown as dashed lines). In this embodiment, the unlocking unit 11 is located within the fender material of the vehicle 100 and thus in a position that is inaccessible from the outside and from the interior of the vehicle 100. However, the unlocking unit 11 could also be installed reversibly in the vehicle 100, for example on the windscreen of the vehicle 100. The charging of the vehicle 100 can be made possible, for example, by activating corresponding components 140 of the electric vehicle 100 through an opening in a trunk and/or loading area 120 of the vehicle 100 by means of the control signals 14 sent by the activation unit 11 to the system controller 110. In the case of a vehicle 100 as an electric vehicle, the control signals 14 transmitted by the unlocking unit 11 to the system controller 110 may also enable the electric vehicle 100 to be charged. In this case, the system controller 110 unlocks a filler flap and the charging control of the electric vehicle 100 or enables it to function on the basis of the control signal 14 when charging the electric vehicle 100 is desired.

Figure 3:
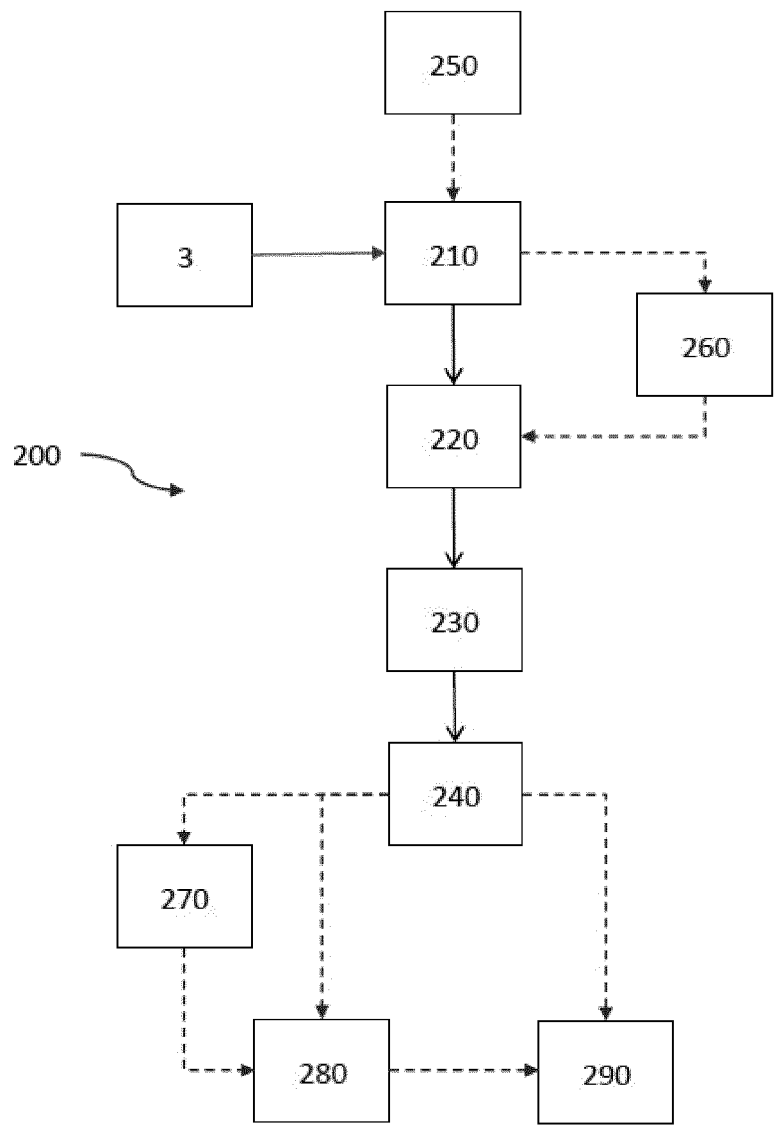
FIG. 3: Schematic representation of an embodiment of the method according to the invention.

FIG. 3 shows a schematic representation of an embodiment of the method according to the invention 200 for granting an access authorization to a vehicle 100 with a locking system and a control unit 110 at least for controlling the locking system as well as an digital access system 1 according to the invention installed in the vehicle 100 as shown in FIGS. 1 and 2. The method comprises the following steps of activating 210 the unlocking unit 11 at least for a predetermined period of time by the activation unit 13 located outside the vehicle 100 by means of wireless data communication 21 to the unlocking unit 11. The step of activating may be preceded by carrying out 250 an authorization check of the activation unit 13 on the basis of data for the authorization of the activation unit 13 by a processor unit 111 of the unlocking unit, whereby the activation 210 of the unlocking unit 11 is then only carried out after the authorization check of the activation unit 13 has been successful. Therefore, the unlocking unit 11 may also comprise a memory 112 for storing these data for the activation unit and/or the access unit. After activating 210, the step of arranging 220 external access arranging to the vehicle 100 by the access unit 12, which is also outside the vehicle 100, is carried out by means of an independent wireless data communication 22 separate to the previous data communication 21 with the receiving unit 11 previously activated by the activation unit 13. The step of arranging 220 may be preceded by carrying out 260 an authorization check of the access unit by means of an identification code transmitted from the access unit to the unlocking unit 13 by the processor unit 111. Data communication 22 with the access unit 12 is followed by transmitting 230 of the control signals 14 arranging the access to the system controller 110 by the unlocking unit 11 in response to the data communication 22 with the access unit 12. This is followed by controlling 240 of the locking system and activating at least one locking component 140 to enable access to the vehicle to its loading by the system controller 110. In an embodiment, the further steps of instructing 270 the system controller 110 by the access unit 11 to lock the components 140 for charging the vehicle at the latest after expiration of the predetermined period of activation, provided that they have been unlocked due to the previous Data communication 22 with the access unit 12, and/or locking 280 the corresponding components 140 by the system controller 110 of the vehicle 100 after completion of charging the vehicle 100 after corresponding Data communication 22 between access unit 12 and access unit 11 can be performed. In a further step, additional characteristic data about the completed loading of the vehicle 100 can be transmitted 290 by the activation unit 11 to the activation unit 14 and/or to the access unit 12 after locking of the components 140 of the vehicle 100. In an embodiment where the vehicle 100 is an electric vehicle, transmitting 230 allows at least one charging and/or loading of the electric vehicle 100 or one opening of a trunk and/or a loading area 120 by activating the corresponding components 140 of the electric vehicle 100.

Detailed Description of the Embodiments of the Dynamic Loading System:

FIG. 4 shows a schematic representation of an embodiment of the invention-based charging system 1001 for dynamic charging of electric vehicles 1002 comprising one or more mobile devices 1003 (for reasons of clarity, only one mobile device in an electric vehicle 1002 is shown here as an example) which each comprise a navigation function or can be connected to a navigation device 1022 in the respective electric vehicle 1002 and a software application 1004 installed and executed on the respective mobile device 1003 as well as a plurality of mobile charging vehicles 1005 each with a navigation device 1051 which is configured, inter alia, to transmit a current position P5 of each mobile charging vehicle 1005 of charging system 1001 to software application 1004. The software application 1004 is configured to display at least the next mobile charging vehicle 1005 on the mobile device 1003 located in an electric vehicle 1002 and, in case of an electric battery 1021 of the electric vehicle 1002 to be charged, to transmit a charging request for this electric vehicle 1002 as well as at least one current position P2 of the electric vehicle 1002 to the displayed mobile charging vehicle 1005, whereby the current position of the mobile device is equated with the current position P2 of the electric vehicle 1002 since the mobile device 1003 is located on board the electric vehicle 1002. The navigation apparatus 1051 of the charging vehicle 1005 is in turn configured to transmit coordinates of a suitable common meeting point TP and a suitable meeting time TZ for charging the battery 1021 of the electric vehicle 1002 to the mobile device 1003 in the electric vehicle 1002 to be charged on the basis of the received charging request, whereby the software application 1004 is configured to convert meeting point TP and meeting time TZ into navigation instructions for a driver of the electric vehicle 1002 to be charged. The software application 1004 can only generate the navigation instructions from the common meeting point TP and meeting time TZ for the electric vehicle 1002 after transmitting a confirmation of the charging request at the common meeting point TP to the charging vehicle 5 via the software application 1004. In an embodiment, the software application 4 can also be configured to display all positions P5 of all charging vehicles 1005 to enable the selection of a desired charging vehicle 1005 for charging the electric vehicle 1002 by an operator of the mobile device (e.g. the driver of electric vehicle 1002).

FIG. 5 shows a schematic representation of an embodiment of the electric vehicle 1002 with an electric battery 1021 for the operation of the electric vehicle 1002 and with a mobile device 1003 and inventive software application 1004 installed on it. Here, the software application 1004 can be configured to convert meeting point TP and meeting time TZ into navigation instructions for a driver of the electric vehicle 1002 to be charged, wherein the software application 1004 can display the current position P5 of the charging vehicle 1005 on the way to the common meeting point TP on a navigation display in the electric vehicle 1002. The navigation display can be the screen of the mobile device 1003 or the screen of the navigation device 1022 connected to the mobile device 1003 in electric vehicle 1002. For this purpose, the mobile device 1003 can be connected to the navigation device 1022 via a cable or an interface for wireless near field communication (e.g. Bluetooth). The software application 1004 provides appropriate interfaces for data transfer to the 1022 navigation device. In one embodiment, the navigation apparatus 1051 of the charging vehicle 1005 can transmit the current position P5 of the charging vehicle 1005 at least periodically to software application 1004 for retrieval in the electric vehicle 1002 on its way to the common meeting point TP until the charging vehicle 1005 has reached the common meeting point TP.

FIG. 6 shows a schematic representation of the calculation of the common meeting point TP based on position and movement data of the electric vehicle 1002 as well as the routes FRE, FRL of the charging vehicle 1005 and the electric vehicle 1002 to the common meeting point TP. Provided that together with the charging request only the current position P2 of the electric vehicle 1002 is transmitted to the displayed mobile charging vehicle 1005, the navigation apparatus 1051 of the charging vehicle 1005 can, without knowledge of the previous route BR and the planned future route GR of the electric vehicle 1002, use only a meeting point area TG1 (circle represented by a dash point line) around the current position P2 of the electric vehicle 1002 to calculate an appropriate common meeting point TP, the diameter of which is determined, for example, by the road conditions and assumed speeds of the two vehicles 1002, 1005. If, on the other hand, the common meeting point TP and the meeting time TZ are determined by the navigation apparatus 1051 of the mobile charging vehicle 1005 taking into account a previous route BR of the electric vehicle to be charged 1002, another meeting point area TG2 can be assumed on the basis of the assumption that the previous route will continue approximately in the same way, extrapolating the previous route BR of the electric vehicle 1002 into a corresponding forward movement, here represented as a dashed drop-shaped area TG2. A common meeting point in area TG2 disturbs the route of the electric vehicle 1002 significantly less than a meeting point in area TG1 based only on the current position P2 of the electric vehicle 1002 at the time of transmission of the charging request. For this purpose the software application 1004 transmits the previous route BR based on correspondingly recorded position data with the charging request to the mobile charging vehicle 1005. If the software application 1004 transmits in addition to the previous route BR also the route GR planned for the electric vehicle 1002 up to a route destination RZ to the charging vehicle 1005, the navigation apparatus 1051 of the charging vehicle 1005 can take into account the planned route GR for the calculation of the common meeting point TP and the meeting time TZ as shown in FIG. 6. Here the common meeting point TP is exactly on the planned route GP of the electric vehicle 1002 to the route destination RZ. Therefore, the planned charging of the battery 1021 of the electric vehicle 1002 does not interfere with the route BR,GR of the electric vehicle 1002 at all, since the common meeting point TP and the driving distance FRE of the electric vehicle 1002 to the meeting point TP corresponds to the planned route GR and therefore no detours and additional driving times have to be accepted. The navigation apparatus 1051 of charging vehicle 1005 can automatically calculate the fastest route for charging vehicle 1005 to the meeting point TP and display it as driving route FRL in charging vehicle 1005.

FIG. 7 shows a schematic representation of the charging vehicle 1005 according to the invention, which in this case has a battery storage 1052 of more than 300 kWh and a DC charging unit 1053 and an AC charging unit 1054 in addition to the navigation apparatus 1051. Other charging vehicles may also have more DC and/or AC charging units 1053, 1054. The multiple charging units 1053, 1054 enable simultaneous charging of several 1002 electric vehicles 1002 each with battery 1021 and mobile devices 1003, on which the software applications 1004 are installed and executed.

Figure 9:
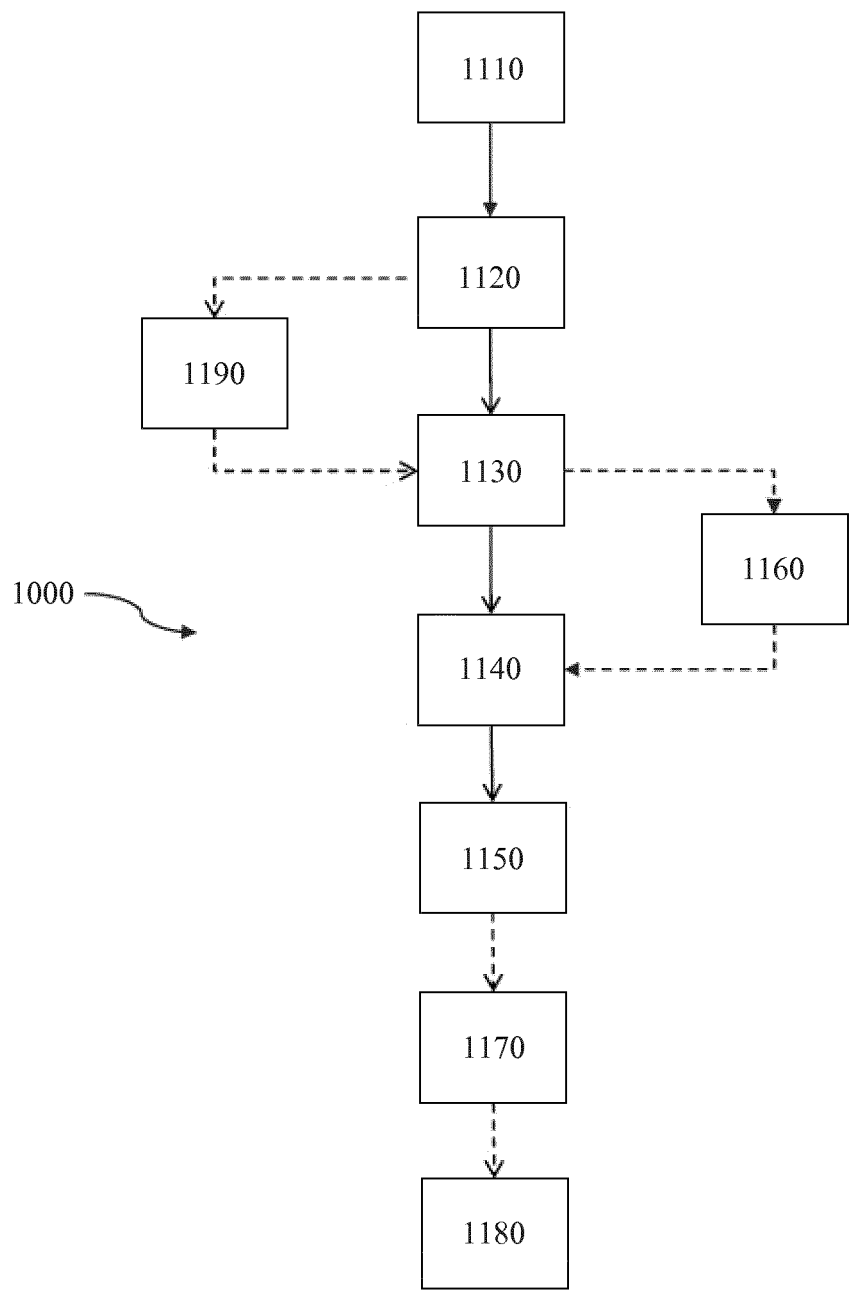

FIG. 8 shows a schematic representation of the data storage product 1010 according to the invention with software application 1004 stored thereon, which is suitable for the execution of the steps of method 1100 according to FIG. 9, which are related to software application 1004. Data storage products 1010 can be any memory suitable for storing software programs such as software applications, for example data sticks, CDs, hard disks, servers and other devices suitable for this purpose.

FIG. 9 displays a schematic representation of an embodiment of the method according to the invention 1100 for dynamic charging of electric vehicles in a charging system according to the invention comprising a software application 1004 installed and executed at least on a mobile device 1003, which comprises a navigation function or can be connected to a navigation apparatus 1022 respectively, and a plurality of mobile charging vehicles 1005 each with a navigation device 1051. In this embodiment, the method comprises the steps of transmitting 1110 of current positions P5 of each mobile charging vehicle 1005 of the charging system 1001 to the software application 1004 by the navigation apparatus 1051 of the charging vehicle 1005; of displaying 1120 at least the next mobile charging vehicle 1005 on the mobile device 1003 located in an electric vehicle 1002 by the software application; transmitting 1130 by the software application a charging request for the electric vehicle 1002 and at least one current position P2 of the electric vehicle 1002 to the indicated mobile charging vehicle 1005 in the case of an electric battery 1021 of the electric vehicle 1002 to be charged; transmitting 1140 coordinates of a suitable common meeting point TP and a suitable meeting time TZ for charging the battery 1021 of the electric vehicle 1002 on the basis of the received charging request to the mobile device 1003 in the electric vehicle 1002 to be charged in the electric vehicle 1002 by the navigation apparatus 1051 of the charging vehicle 1005; and converting 1150 of meeting point TP and meeting time TZ into navigation instructions for a driver of the electric vehicle to be charged 1002 by the software application 4 for navigating the electric vehicle 1002 to the common meeting point TP. In an embodiment (dotted arrow), the method comprises the additional step of at least periodically transmitting 1170 the current position P5 of the charging vehicle 1005 on a way to the common meeting point by the navigation apparatus 1051 to the software application 1004 for a retrieval the electric vehicle 1002 and displaying 1180 the current position P5 of the charging vehicle 1005 on the way to the common meeting point TP by the software application 1004 on a navigation display in the electric vehicle 1002. Subsequent to step 1130, the method may comprise the additional step of determining 1160 the common meeting point TP and the meeting time TZ taking into account at least one previous route BR of the electric vehicle to be charged 1002 from the navigation apparatus 1051 of the mobile charging vehicle 1005, wherein the software application 1004 transmitted the previous route BR to the mobile charging vehicle 1005 together with the charging request on the basis of correspondingly recorded position data. Furthermore, in addition to the previous route BR, the software application 1004 can also transmit the route GR planned for the electric vehicle 1002 up to a route destination RZ to the charging vehicle 1005, and the navigation apparatus 1051 of the charging vehicle 1005 can take into account the planned route GR for calculating 1160 of the common meeting point TP and the meeting time TZ.

Detailed Description of the Energy Storage Embodiments:

FIG. 10 shows a schematic representation of an embodiment of the energy storage unit 2001 according to the invention for charging stations 2010, which comprises an energy storage unit 2011 and a control module (2012) connected to the energy storage unit 2011 at least with several supply power connections 2013 for reception E of electrical energy and several output power connections 2014 for disposal A of electrical energy. The control module 2012 is designed to forward W the electrical energy received via the supply power connections 2013 to the energy storage unit 2011 and/or to the output power connections 2014 and the electrical energy to be disposed of from the supply power connections 2013 and/or the energy storage unit 2011 via the output power connections 2014 for demand-based disposal to one or more charging stations 2002 for electric vehicles. The number of three supply power connections 2013 and three output power connections 2014 shown here is just one example. The number of both connection types can vary greatly depending on the application. Therefore, the control module 2012 includes several appropriately controlled voltage transformers (for example, several transformers and/or converters in an appropriate number and arrangement). This enables the reception, disposal or forwarding E, A, W of electrical energy between the supply and output power connections 2013, 2014 simultaneously with different voltage and power. Therefore, the 2012 control module monitors the electrical energy arriving at the supply power connections 2013 and the electrical energy requested at the output power connections 2014 and adapts it to the respective requirements by means of the voltage transformers. One of the supply power connections 2013 can be connected to the public power grid 2031 to ensure a basic energy supply. One or more other of the supply power connections 2013 can be configured for connection to at least one renewable energy source 2032, 2033, preferably to a wind and/or solar energy plant 2032, 2033. At least one of the output power connections 2014 can be configured for single-pole and/or three-pole connections for the disposal of direct and/or alternating current. In addition, the 2012 control module can be configured to control the reception, disposal or forwarding E, A, W of electrical energy between supply power connections 2013, energy storage unit 2011 and output power connections 2014 on the basis of received meteorological data WD and statistically determined consumption parameters VP of energy. The energy storage unit 2011 can include at least one or more battery storage units 2111, which are connected to the control module in an appropriate manner, for the storage of energy.

FIG. 11 shows a schematic representation of another embodiment of the energy storage unit 2001 according to the invention here compared to FIG. 10 additionally with hydrogen storage 2016, fuel cell 2017 and electrolyzer 2018. In the following only the components not shown in FIG. 10 are described, for all other components reference is made to FIG. 10. The hydrogen storage 2016 is connected here to at least one fuel cell 2017, which supplies the electrical energy generated in the fuel cell 2017 to the connected supply power connection 2013. In addition, an electrolyzer 2018 is connected to the hydrogen storage 16, which is supplied with electricity by the control module 2012 for electrolysis of a suitable raw material to produce hydrogen, which is then stored in the hydrogen storage 2016. The single hydrogen storage unit shown in this embodiment can be replaced by a variety of hydrogen storage units in other embodiments. In other embodiments, the number of electrolyzers and fuel cells can also be higher than shown here. The piping of the individual components with each other as well as the electrical connections can be carried out in an appropriate manner by a skilled person. The control module 2012 can automatically determine a suitable storage amount in the energy storage unit 2011 and in the hydrogen storage unit(s) 2016 according to the meteorological data WD and consumption parameters VP and adapt filling levels in the energy storage unit 2011 and/or in the hydrogen storage unit(s) 2016 by means of energy storage or hydrogen production or their respective consumption accordingly.

FIG. 12 shows a schematic representation of an embodiment of the charging station 2010 according to the invention for parallel charging of several electric vehicles 2005, comprising an energy storage unit 2001 according to the invention with one mains power supply 2004 for each output power connection 2014, to which one or more charging points 2002 are connected here, wherein the energy storage unit 2001 is connected to the charging points 2002 for disposal A of electrical energy via the internal mains power supplies 2004 and is connected to the public power grid 2031 for reception E of electrical energy. Furthermore, the charging station 2010 comprises a wind and solar power plant 2032, 2033, which are connected to the energy storage 2001 and to the internal mains power supply 2004 via respective separate supply power connections 2013. In addition, a load sensor 2015 is connected to the respective mains power supply 2004 and connected to the control module 2012 of the energy storage unit 2001 via a suitable data line (for reasons of clarity, the dashed lines are only shown for a mains power supply 2004), so that the control module 2012 can carry out a loading test in the respective mains power supply 2004 and, if required, provide additional electrical energy from the energy storage unit 2011 for the respective mains power supply 2004 in order to avoid overloading the supply power connections 2013. In addition, the charging station 2010 receives meteorological data WD from a weather station 2020 of charging station 1 and transmits this meteorological data WD to the control module 2012 so that the control module 2012 can control the reception, disposal or forwarding E, A, W of electrical energy between supply power connections 2013, energy storage unit 2011 and output power connections 2014 on the basis of the meteorological data WD and/or statistically determined consumption parameters VP of energy. In an embodiment (not explicitly shown here), at least one of the output power connections 2014 is connected to the public power grid 2031 as a refeed connection. The control module 2012 can be configured to not only forward W electrical energy from the supply power connections 2013 to the output power connections 2014 for disposal A of electrical energy to the charging stations 2002, but also to carry out a loading test in all mains supplies 2004 connected to the supply power connections and, if required, to provide additional electrical energy from the energy storage unit 2011 for the respective mains power supply network 2004 in order to avoid overloading the supply power connections 2013. In the event of no overload of the mains power supply 2004 is determined by the loading test, the control module 2012 can forward at least a part of the electrical energy E received via the supply power connections 2013 to the energy storage unit 2011 in order to increase the amount of energy stored in the energy storage unit 2111 in case of need.

FIG. 13 shows a schematic representation of an embodiment of the method according to the invention 2100 for operating a charging station 2010 for parallel charging of several electric vehicles 2005 comprising several charging columns 2002 connected to each other via a mains power supply 2004 of the charging station 2010 and at least one energy storage unit 2001 (see FIG. 10 or 11) according to the invention comprising an energy storage unit 2011 and a control module 2012 connected to the energy storage unit 2011 with at least several supply power connections 2013 for reception E of electric energy and several output power connections 2014 for disposal A of electric energy, wherein the energy storage device 2001 is connected for disposal A of the electrical energy via the internal mains power supply in 2004 to the charging columns 2002 and is connected for reception E of the electrical energy at least to the public power grid 2031, wherein the control module 2012 executes the following steps in the method according to the invention: forwarding 2110 the electrical energy received via the supply power connections 2013 to the energy storage unit 2011 and/or to the output power connections 2014; monitoring 2120 the electrical energy arriving at the supply power connections 2013 and the electrical energy requested at the output power connections 2014; reception, disposal or forwarding 2130 of the electrical energy between the supply and output power connections 2013, 2014 simultaneously with different voltage and power by means of appropriately controlled voltage transformers in the control module 2011; and demand-based dispensing 2140 of the electrical energy by means of forwarding W of the electrical energy to be dispensed from the supply power connections 2013 and/or the energy storage unit 2011 via the output power connections 2014 to the mains power supply 2004 to supply the charging stations 2002. For the reception, disposal and forwarding 2130 of the energy to be dispensed to a demand-based disposal 2140, in an embodiment the additional steps of carrying out 2150 a loading test in the mains power supply 2004 by means of one or more load sensors 2015, which are arranged at an appropriate point in the mains power supply 2004; of providing 2160 additional electrical energy from the energy storage unit 2011 to the supply network 2004 on demand in order to avoid overload on the side of the supply power connections 2013; and of forwarding 2170 at least part of the electrical energy received via the supply power connections 2013 to the energy storage unit 2011 if no overload of the supply network 2004 was detected by the loading test, can be performed. The controlling 2180 of the reception, disposal or forwarding of the electrical energy between supply power connections, energy storage unit and output power connections can be carried out on the basis of received meteorological data and statistically determined consumption parameters at the charging stations. In an embodiment where the energy storage unit 2001 further comprises at least one hydrogen storage unit 2016 connected to at least one fuel cell 2017 for the generation of electrical energy connected to at least one of the supply power connections 2013 and an electrolyzer 2018 connected to the hydrogen storage unit(s) 2016, whereby the electrolyzer 2018 is supplied with electricity by means of the control module 2011 for the electrolysis of water which is subsequently stored in the hydrogen storage unit(s) 2016, the following further steps can be carried out: automatically determining 2190 a storage amount in the energy storage unit 2011 and in the hydrogen storage unit(s) 2016 that is appropriate according to the meteorological data WD and consumption parameters VP; and correspondingly adapting 2200 the filling levels in the energy storage unit 2011 and/or in the hydrogen storage unit(s) 2016 by means of energy storage or hydrogen production or their respective consumption.

The embodiments shown here are only examples of the present invention and must therefore not be understood in a restrictive way. Alternative embodiments considered by the skilled person are equally covered by the scope of protection of the present invention.

The embodiments shown here are only examples of the present invention and must therefore not be understood in a restrictive way. Alternative embodiments considered by a skilled person are equally covered by the scope of protection of the present invention. In particular, the features disclosed in the above description, in particular in the form of the examples B1 to B17 or the illustrations V1 to V21, in the claims and in the figures can be essential for the invention in its various embodiments, either individually or in any combination.

LIST OF REFERENCE SIGNS

1 Access system according to the invention
11 unlocking unit
111 processor unit
112 memories
12 access unit
13 activation unit
14 control signals
21 data communication between activation unit and unlocking unit
22 data communication between access unit and unlocking unit
3 users
100 vehicle according to the invention, for example an electric vehicle
110 system controller of the vehicle
120 trunk and/or loading area
130 receiving aerial
140 components of the vehicle, e.g. filler flap or closure of the trunk or loading area
200 method according to the invention
210 activating an unlocking unit positioned in the vehicle
220 arranging access arranging from outside to the vehicle
230 transmitting control signals to the system controller
240 controlling the locking system and releasing at least one locking component of the vehicle
250 carrying out an authorization check of the activation unit
260 carrying out an authorization check of the access unit
270 instructing the system controller to lock the components after the predetermined period
280 locking of the components by the system controller after completion of charging or loading
290 transferring characteristic data on the loading after the vehicle components have been locked
1001 charging system for dynamically charging electric vehicles
1002 electric vehicle (to be charged)
1021 battery of the electric vehicle
1022 navigation device in electric vehicle
1003 mobile device
1004 software application
1005 mobile charging vehicle
1051 navigation apparatus of the charging vehicle
1052 battery storage of the charging vehicle
1053 DC charging unit of the charging vehicle
1054 AC charging unit of the charging vehicle
1010 data storage product
1100 method for dynamic charging of electric vehicles
1110 transmitting the current position of charging vehicles to the software application
1120 displaying at least the next charging vehicle on the mobile device
1130 transmitting a charging request for the electric vehicle to the charging vehicle
1140 transmitting coordinates of the common meeting point and the meeting time to the mobile device
1150 converting meeting point and meeting time into navigation instructions for a driver of the electric vehicle to be charged
1160 determining the common meeting point and the meeting time taking into account at least one previous route of the electric vehicle to be charged
1170 at least periodically transmitting to the software application the current position of the charging vehicle on its way to the common meeting point
1180 displaying of the current Position of the charging vehicle on the way to the common meeting point by the software application in the electric vehicle
1190 selecting one of the displayed charging vehicles as the charging vehicle for charging the vehicle battery
BR previous route of the electric vehicle to be charged
FRL driving route of the charging vehicle to the common meeting point
FRE driving route of the electric vehicle to the common meeting point
GP planned route of the electric vehicle
P2 current position of the electric vehicle
P5 current position of the charging vehicle
RZ route destination of the electric vehicle
TG1 potential meeting point area with consideration of the current position of the electric vehicle
TG2 potential meeting point area with consideration of the previous route of the electric vehicle
TP meeting point for charging vehicle and electric vehicle to be charged
TZ meeting time for the meeting of charging vehicle and electric vehicle to be charged
2001 energy storage system according to invention
2011 energy storage unit
2111 battery storage of the energy storage unit
2012 control module
2013 supply power connections
2014 output power connections
2015 load sensors
2016 hydrogen storage
2017 fuel cell
2018 electrolyzer
2002 charging stations
2031 public power grid 2032 renewable energy source, e.g. a wind turbine
2033 renewable energy source, e.g. a solar energy plant
2004 mains power supply
2005 electric vehicles
2010 charging station according to invention
2020 weather station
2100 method for operating a charging station according to the invention
2110 forwarding electrical energy received via the supply power connections
2120 monitoring the electrical energy arriving at the supply power connections
2130 reception, disposal or forwarding of electrical energy between the supply and output power connections simultaneously at different voltages and power
2140 demand-based dispensing of electrical energy
2150 carrying out a loading test in the mains power supply
2160 providing additional electrical energy from the energy storage unit for the mains power supply on demand
2170 forwarding at least part of the electrical energy received via the supply power connections to the energy storage unit
2180 controlling the reception, disposal or forwarding of electrical energy on the basis of received meteorological data and statistically determined consumption parameters
2190 automatic determination of an appropriate storage amount of energy according to meteorological data and consumption parameters
2200 corresponding adaptation of the filling levels in the energy storage unit and/or in the hydrogen storage unit(s)
A disposal of electrical energy
E reception of electrical energy
VP statistically determined consumption parameters at the charging stations
W forwarding of electrical energy
WD meteorological data

The invention claimed is:

1. A digital access system at least suitable for installation in a vehicle with a locking system and for suitable connection to a system controller of the vehicle, wherein the access system comprises at least one unlocking unit for positioning in the vehicle, at least one access unit and at least one activation unit for use outside the vehicle, wherein the activation unit is designed to activate the unlocking unit at least for a period by means of wireless data communication to the unlocking unit, the access unit is configured to arrange access to the vehicle from outside by means of an independent wireless data communication, that is separate from the previous data communication, with a receiving unit previously activated by the activation unit, wherein, in response to data communication with the access unit, the unlocking unit is configured to transmit access-initiating control signals to the system controller for controlling the locking system and unlocking at least one lock to allow access to the vehicle for its load, wherein the access system comprises a background computer system, which is configured to:

enable registration of users and an entry of data on one or more of: the vehicle; the unlocking units; the access units; and the activation units, and perform a suitable transmission of data to the unlocking unit to enable an authorization check to be carried out by the unlocking unit, wherein the vehicle is an electric vehicle and the control signals transmitted from the unlocking unit to the system controller are provided to enable at least one charging and/or loading of the electric vehicle or one opening of a trunk and/or a loading area by means of releasing the corresponding components of the electric vehicle; and wherein an order for a charge and activating the authorization data for the unlocking unit as well as other communicated data is carried out via a Distributed Ledger Technology (DLT) program system or a block chain program system within the background computer system.

2. The access system according to claim 1, characterized in that the unlocking unit is designed at least for receiving signals and/or data by means of radio, WLAN or near field communication, preferably RFID.

3. The access system according to claim 1, characterized in that, the unlocking unit comprises a processor unit with memory on which data for authorizing the activation unit and/or the access unit are stored, and the processor unit is configured to perform an authorization check on the basis of these data.

4. The access system according to claim 3, characterized in that the unlocking unit is configured to perform the activation only after a successful authorization check of the activation unit.

5. The access system according to claim 1, characterized in that the unlocking unit is configured to send out signals to scan for available access units in the activated state.

6. The access system according to claim 1, characterized in that the access unit is at least configured for transmitting signals and/or data by means of radio, WLAN or near field communication, preferably RFID.

7. The access system according to claim 1, characterized in that the access unit is configured to transmit at least one identification code to the unlocking unit, on the basis of which the unlocking unit can carry out an authorization check of the access unit, wherein the transmitting of the control signals to the system controller only takes place after a successful authorization check of the access unit.

8. The access system according to claim 7, characterized in that the access unit is a transponder which is configured to transmit at least the identification code to the unlocking unit after receiving the data communication from the unlocking unit.

9. The access system according to claim 8, characterized in that the transponder is a passive transponder.

10. The access system according to claim 1, characterized in that the unlocking unit is configured to instruct the system controller, at the latest after expiry of the predetermined period of activation, to relock the components unlocked on the basis of the previous data communication with the access unit.

11. The access system according to one of the claim 10, characterized in that the unlocking unit is configured to transmit characteristic data about the completed loading of the vehicle to the activation unit and/or the access unit after the components of the vehicle have been locked.

12. The access system according to claim 1, characterized in that the access unit is configured to arrange for locking of the respective components by means of corresponding data communication with the unlocking unit by the system controller of the vehicle after completion of the loading of the vehicle.

13. The access system according to claim 1, characterized in that the unlocking unit is configured for reversible arrangement in the vehicle and for connection to the system controller.

14. The access system according to claim 1, characterized in that the data communication is encrypted.

15. A vehicle with a locking system and a control unit at least for controlling the locking system as well as a digital access system according to claim 1 comprising at least one access unit and at least one activation unit for use outside the vehicle and an unlocking unit positioned in the vehicle and suitably connected to the control unit in order to allow access to the vehicle to its loading by controlling the locking system and releasing at least one lock.

16. The vehicle according to claim 15, characterized in that the unlocking unit is connected to a receiving aerial of the vehicle.

17. The vehicle according to claim 15, characterized in that the unlocking unit is arranged in the vehicle at a location inaccessible from the outside and/or from the interior of the vehicle.

18. The vehicle according to claim 15, characterized in that the unlocking unit is reversibly installed in the vehicle.

19. The vehicle according to one of the claim 15, characterized in that the vehicle is an electric vehicle and the control signals transmitted from the unlocking unit to the system controller are provided to enable at least one charging and/or loading of the electric vehicle or one opening of a trunk and/or a loading area by releasing corresponding components of the electric vehicle.

20. The vehicle according to claim 19, characterized in that the system controller of the electric vehicle unlocks at least one filler flap as one of the components on the basis of the control signal of the unlocking unit when charging and/or loading of the electric vehicle is desired and/or functionally unlocks it via diagnostic connections of the electric vehicle.

21. A method for granting an access authorization to a vehicle with a locking system and a control unit at least for controlling the locking system as well as a digital access system installed in the vehicle according to claim 1 comprising:
    at least one access unit and at least one activation unit for use outside the vehicle and an unlocking unit positioned in the vehicle and suitably connected to the control unit, and
    a background computer system, which is configured to:
    enable registration of users and an entry of data on one or more of: the vehicle; the unlocking unit; the access units; and the activation units, and perform a suitable transmission of data to the unlocking unit to enable an authorization check to be carried out by the unlocking unit, comprising the following steps:
    activating the unlocking unit at least for a period by the activation unit located outside the vehicle by means of wireless data communication to the unlocking unit;
    arranging an access from outside to the vehicle by the access unit also located outside the vehicle by means of an independent wireless data communication separate from the previous data communication with a receiving unit previously activated by the activation unit;
    transmitting access arranging control signals to the system controller by the unlocking unit in response to the data communication with the access unit; and
    controlling the locking system and enabling at least one lock to allow access to the vehicle for loading the same by the system controller;
    wherein the vehicle is an electric vehicle, enables transmitting access arranging control signals to the system controller for at least one charging and/or loading of the electric vehicle or an opening of a trunk and/or a loading area by means of releasing the corresponding components of the electric vehicle, and
    wherein an order for a charge and activating the authorization data for the unlocking unit as well as other communicated data is carried out via a Distributed Ledger Technology (DLT) program system or a block chain program system within the background computer system.

22. The method according to claim 21, wherein the unlocking unit comprises a processor unit with memory on which data for authorizing the activation unit and/or the access unit are stored, comprising the further steps:
    carrying out an authorization check of the activation unit using these data by the processor unit and activating the unlocking unit only after the authorization check of the activation unit has been successful, and/or
    carrying out an authorization check of the access unit by means of an identification code transmitted from the access unit to the unlocking unit by the processor unit and transmitting the control signals only after success of the authorization check of the access unit.

23. The method according to claim 21, comprising the further steps:
    instructing the system controller by the unlocking unit, at the latest after the expiry of the predetermined period of activation, to lock the components for loading the vehicle if they have been unlocked due to the previous data communication with the access unit; and/or
    locking of the corresponding components by the system controller of the vehicle after completion of the loading of the vehicle after corresponding data communication between access unit and unlocking unit.

24. The method according to one of claim 21, comprising the further step:
    transmission of characteristic data about the completed loading of the vehicle by the unlocking unit to the activation unit and/or to the access unit after the components of the vehicle have been locked.

* * * * *